(12) United States Patent
Livchak et al.

(10) Patent No.: US 11,291,870 B2
(45) Date of Patent: Apr. 5, 2022

(54) FIRE SAFETY DEVICES METHODS AND SYSTEMS

(71) Applicant: Oy Halton Group Ltd., Helsinki (FI)

(72) Inventors: Andrey V. Livchak, Bowling Green, KY (US); Derek W. Schrock, Bowling Green, KY (US); Gregory A. Lyons, Tompkinsville, KY (US); Jimmy Sandusky, Bowling Green, KY (US); Kyle Sunderlin, Madison, TN (US); Philip J. Meredith, Alvaton, KY (US); Nicholas Harlow, Glasgow, KY (US)

(73) Assignee: Oy Halton Group Ltd., Helsinki (FI)

( * ) Notice: Subject to any disclaimer, the term of this patent is extended or adjusted under 35 U.S.C. 154(b) by 0 days.

(21) Appl. No.: 16/487,582

(22) PCT Filed: Mar. 20, 2018

(86) PCT No.: PCT/US2018/023432
§ 371 (c)(1),
(2) Date: Aug. 21, 2019

(87) PCT Pub. No.: WO2018/175495
PCT Pub. Date: Sep. 27, 2018

(65) Prior Publication Data
US 2020/0054905 A1    Feb. 20, 2020

Related U.S. Application Data

(60) Provisional application No. 62/473,747, filed on Mar. 20, 2017.

(51) Int. Cl.
*A62C 3/00* (2006.01)
*A62C 37/38* (2006.01)
(Continued)

(52) U.S. Cl.
CPC ............ *A62C 3/006* (2013.01); *A62C 37/38* (2013.01); *G06K 9/00771* (2013.01);
(Continued)

(58) Field of Classification Search
CPC .... A62C 3/006; A62C 37/38; G06K 9/00771; G06K 9/6267; G08B 5/36; G08B 13/19; G08B 17/107; G08B 17/125
(Continued)

(56) References Cited

U.S. PATENT DOCUMENTS 6,611,206 B2    8/2003    Eshelman et al.
7,155,029 B2    12/2006   King et al.
(Continued)

FOREIGN PATENT DOCUMENTS

CN        1943824 B      6/2010
CN       104952201 A     9/2015
(Continued)

OTHER PUBLICATIONS

Office Action dated May 29, 2020 for Colombian Patent Application No. NC2019/0010356.
(Continued)

*Primary Examiner* — Steven J Ganey
(74) *Attorney, Agent, or Firm* — Potomac Law Group, PLLC; George Dolina

(57) ABSTRACT

A fire safety system particularly adapted for commercial kitchen applications provides control of exhaust levels for energy efficiency and intelligently responds to fires or fire risks. In embodiments, systems may provide early warning of fire hazards or impending fires. Embodiments employ probabilistic estimates with alarms that can be canceled. Embodiments employ classifiers that can make use of alarm cancellations as a mechanism for supervised learning.

20 Claims, 16 Drawing Sheets

(51) Int. Cl.
   *G06K 9/00*   (2022.01)
   *G06K 9/62*   (2022.01)
   *G08B 5/36*   (2006.01)
   *G08B 17/12*   (2006.01)
   *G08B 17/107*   (2006.01)
   *G08B 13/19*   (2006.01)

(52) U.S. Cl.
   CPC ............ *G06K 9/6267* (2013.01); *G08B 5/36* (2013.01); *G08B 13/19* (2013.01); *G08B 17/107* (2013.01); *G08B 17/125* (2013.01)

(58) Field of Classification Search
   USPC .......................................................... 169/65
   See application file for complete search history.

(56) References Cited

U.S. PATENT DOCUMENTS

| | | | |
|---|---|---|---|
| 7,953,228 B2 | 5/2011 | Faltesek et al. | |
| 8,487,776 B2 | 7/2013 | Livchak et al. | |
| 9,466,195 B1* | 10/2016 | Boyer | A62C 3/006 |
| 9,494,324 B2 | 11/2016 | Livchak et al. | |
| 2005/0110632 A1 | 5/2005 | Berezowski et al. | |
| 2006/0219235 A1 | 10/2006 | Bagwell et al. | |
| 2008/0036593 A1 | 2/2008 | Rose-Pehrsson et al. | |
| 2008/0149834 A1 | 6/2008 | Bernhardt et al. | |
| 2008/0309761 A1 | 12/2008 | Kienzle et al. | |
| 2009/0128355 A1* | 5/2009 | Urbin | G08B 5/00 340/815.4 |
| 2015/0136430 A1 | 5/2015 | Livchak et al. | |
| 2015/0300653 A1 | 10/2015 | Livchak et al. | |
| 2016/0271434 A1 | 9/2016 | Dusing et al. | |
| 2018/0229060 A1* | 8/2018 | Huotari | A62C 99/0072 |

FOREIGN PATENT DOCUMENTS

| | | |
|---|---|---|
| CN | 105023387 A | 11/2015 |
| CN | 205508040 U | 8/2016 |
| CN | 205642411 U | 10/2016 |
| CN | 205904195 U | 1/2017 |
| CO | 6130007 A1 | 2/2010 |
| GB | 2450732 A | 1/2009 |
| JP | H11287453 A | 10/1999 |
| JP | 2000304315 A | 11/2000 |
| JP | 2009216299 A | 9/2009 |
| JP | 2010530964 A | 9/2010 |
| JP | 2013083654 A | 5/2013 |
| JP | 2015520354 A | 7/2015 |
| KR | 200188197 Y1 | 7/2000 |
| KR | 200417542 Y1 | 5/2006 |
| KR | 101035518 B1 | 5/2011 |
| KR | 1020140061563 A | 5/2014 |
| KR | 1020150080127 A | 7/2015 |
| KR | 101640152 B1 | 7/2016 |
| NL | 1008011 C2 | 8/1999 |
| WO | 2010065793 A1 | 6/2010 |
| WO | 2011103915 A1 | 9/2011 |

OTHER PUBLICATIONS

International Preliminary Report on Patentability dated Jul. 2, 2019 issued in International application No. PCT/US2018/023432.
International Search Report and Written Opinion for International Application No. PCT/US2018/023432 dated Jul. 10, 2018.
Written Opinion of the International Preliminary Examining Authority dated Feb. 20, 2019 for International Patent Application No. PCT/US2018/023432.
Office Action (Examiner's Report No. 1) dated Sep. 16, 2020 for Chilean Patent Application No. 201902660.
Indian Office Action (Examination Report under Section 12 & 13) dated Feb. 3, 2021, issued in Indian Application No. 201917040957.
Office Action (Notice of Preliminary Rejection) dated Dec. 8, 2020 for Korean Patent Application No. 10-2019-7030895.
Office Action (Notice of Reasons for Refusal) dated Jan. 26, 2021 for Japanese Patent Application No. 2019-551631.

* cited by examiner

Conditioned inputs 104

| | |
|---|---|
| T duct gas DC 401 | IR cooking surface DC 407 |
| ~T duct gas $band_i$ – $band_N$ 402 | ~IR cooking surface $band_i$ – $band_N$ 408 |
| T canopy gas DC 400 | VL DC 409 |
| IR DC 403 | ~VL $band_i$ – $band_N$ 410 |
| ~IR $band_i$ – $band_N$ 404 | IR spot DC 411 |
| T duct wall DC 405 | ~IR spot $band_i$ – $band_N$ 412 |
| ~T duct wall $band_i$ – $band_N$ 406 | VL spot DC 413 |
| ~opacity $band_i$ – $band_N$ 415 | ~VL spot $band_i$ – $band_N$ 414 |
| opacity DC 416 | Audio stream spot 419 |
| Image of occupied area in front of cooking appliance 417 | Audio stream wide 420 |
| | T near and outside hood DC 421 |
| Image of kitchen scene 418 | ~T near and outside hood $band_i$ – $band_N$ 422 |
| Image of cooking surface 423 | Variable signal running stats 424 |
| Image of cooking surface 425 | Proximity 426 |
| Contaminant accumulation 425 | Modal inputs 427 |

Combiner/reducer/classifier 105

Output effecters 107

| | |
|---|---|
| Color-selective illumination 445 | Stage N suppressant 446 |
| Aiming actuators 447 | UI / Annunciator 448 |
| Mist 449 | Damper N 450 |
| Exhaust fan 451 | Voice comms 452 |
| Text comms 453 | Display 454 |
| Power switch 455 | Flow valves 456 |
| Flow regulation valves 457 | |

Fig. 3G

FIRE SAFETY DEVICES METHODS AND SYSTEMS

CROSS REFERENCE TO RELATED APPLICATIONS

This Application is a U.S. national stage filing under 35 U.S.C. § 371 of International Application No. PCT/US2018/023432 filed Mar. 20, 2018, which claims the benefit of U.S. Provisional Application No. 62/473,747 filed Mar. 20, 2017, each of which are incorporated herein by reference in their entireties.

BACKGROUND

Known fire suppression systems used in hoods placed over cook-stoves or ranges are mainly concerned with delivering fire retardant onto the cooking surface to stop fat or grease fires when a temperature indicative of a fire is measured in the hood plenum or ductwork. The existing fire suppression systems operate by measuring a fixed absolute temperature in the hood plenum or the ductwork and either activating an alarm or the release of fire retardant when a previously set temperature has been reached. This type of approach, however, does not account for changes in the exhaust temperature, nor does it account for scenarios where there is only a flare-up from regular cooking, instead of a fire. In addition, fire suppression systems only detect existing fires. There is a need in the prior art for improved systems for fire detection as well as prevention and for systems with faster response times.

SUMMARY

In embodiments, network-based, or rule-based, methods combine multiple sensor inputs to generate a status indication which is used to control fire suppression and exhaust flow by a single set of sensor inputs. In embodiments, at least one sensor type generating a predefined signal is used to detect fire condition and appliance cooking state, the predefined signal being applied to a controller which differentiates, responsively the predefined signal, in combination with other sensor signals, at least two cooking states each of the cooking states corresponding to at least two exhaust flow rates which the controller implements in response to the controller's differentiation of the two states and which predefined signal is simultaneously used to differentiate a fire condition, in response to the differentiation of which, the same controller activates a fire suppression mechanism such as a water spray or chemical fire extinguisher.

Objects and advantages of embodiments of the disclosed subject matter will become apparent from the following description when considered in conjunction with the accompanying drawings.

BRIEF DESCRIPTION OF DRAWINGS

Embodiments will hereinafter be described in detail below with reference to the accompanying drawings, wherein like reference numerals represent like elements. The accompanying drawings have not necessarily been drawn to scale. Where applicable, some features may not be illustrated to assist in the description of underlying features.

FIG. 3G shows conditioned inputs resulting from the initial processing of FIGS. 3A-3F with an example range of outputs according to embodiments of the disclosed subject matter.

DETAILED DESCRIPTION

In the disclosed embodiments, simple control schemes, or more complex network-based or rule-based, methods and algorithms may combine one or multiple sensor inputs to generate a status indication which is used to control fire suppression and related responses. In addition, the embodiments may provide exhaust flow control from the same set of sensor inputs. In embodiments, at least one sensor type generating a predefined signal is used to detect fire condition and appliance cooking state, the predefined signal being applied to a controller which differentiates, responsively to the predefined signal, in combination with other sensor signals, at least two cooking states each of the cooking states corresponding to at least two exhaust flow rates which the controller implements in response to the controller's differentiation of the two states and which predefined signal is simultaneously used to differentiate a fire condition, in response to the differentiation of which, the same controller activates a fire suppression mechanism such as a water spray or chemical fire extinguisher.

Figure 1:
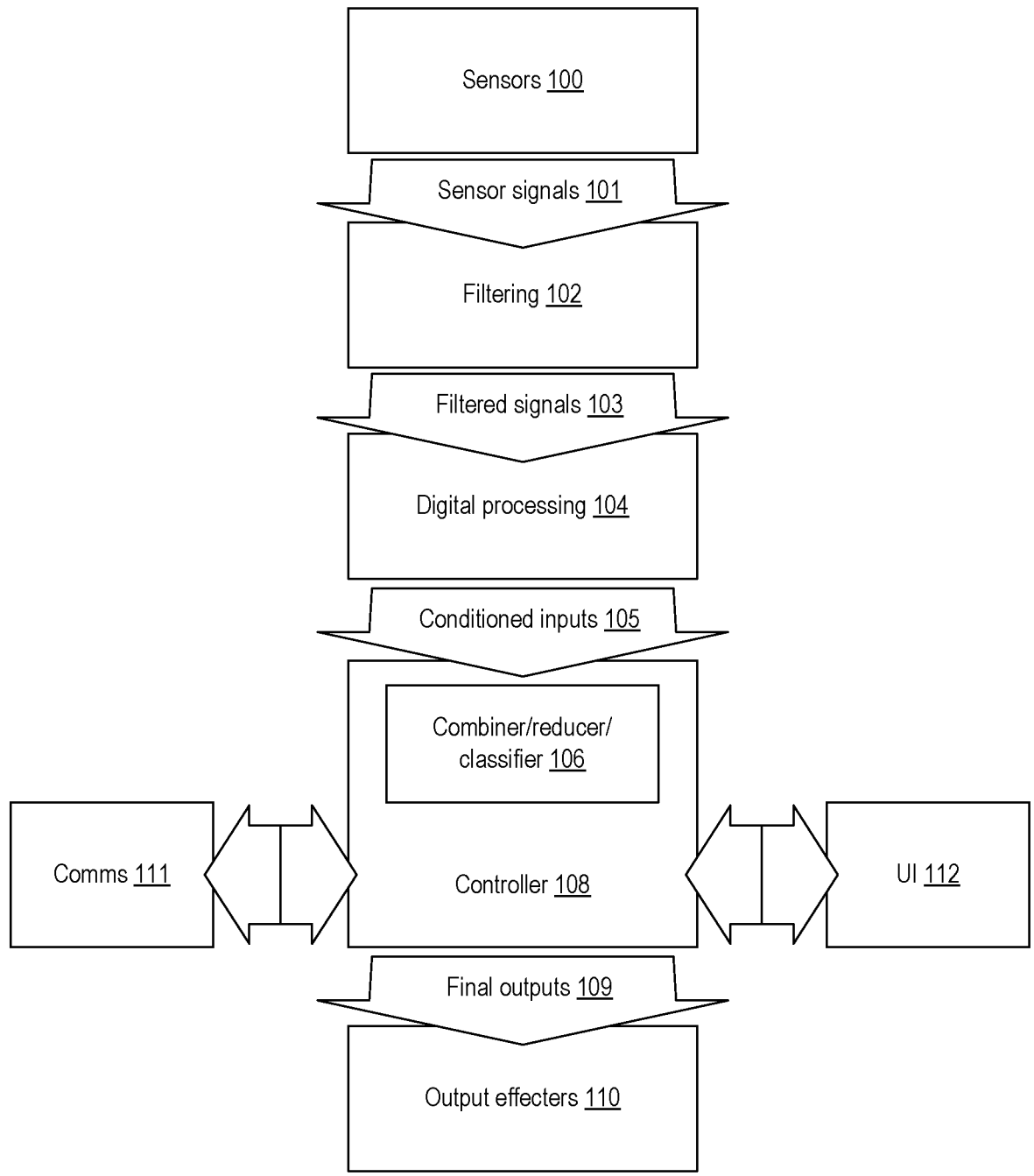
FIG. 1 shows an overview of signal processing and control for fire detection and suppression according to embodiments of the disclosed subject matter.

Referring to FIG. 1, a controller 108 includes a combiner/reducer/classifier 106 that receives one or more conditioned inputs 105 derived from filtered signals 103 which are filtered 105 such as by analog filtering or other type of signal conditioning which may depend on the type of sensor signal 101. The sensors 100 may be of a variety of types and may generate continuous output sensor signals 101. The conditioned inputs 105 may combine to detect a fire which it may indicate by way of an internal signal (not shown).

The fire detection indication may be attended by the generation of one or more signals representing a confidence level associated with the indication of a fire. In the same manner, the controller may also determine a type of fire, a location of the fire, and a size of the fire, each with a corresponding confidence level. All of these may be associated with internal indications such as stored data or signals accessible to the controller 108.

The controller 108 mediates between the fire indications, the confidence levels, other data associated with the fire indication such as location, severity, size, etc. and generates output signals 109 to drive final outputs which may be applied to output effecters 110 which implement some action such as triggering the release of fire suppressant chemicals, selecting and aiming the nozzles for fire suppressant delivery, selecting the type of suppressant, etc. The types and degrees of freedom (DOF) of the output effecters 110 are discussed in examples below.

A user interface 112 may provide one or more of the output effecters 110 or may be unused for output indications related to fires. The user interface 112 may allow the input of modal inputs such as the type of appliance or appliances being monitored, the status of the appliance, the fuel type, the appliance locations, and other information related to the sensors 100, the suppressant delivery effecters, and other information that may be combined with sensor inputs and which may influence the detection of a fire, the response thereto, and the confidence levels associated with detection. The interface may include direct digital interfaces to other devices such as a building management system, appliance interface, etc.

A communications interface 111 may provide functionality for certain outputs such as activation of remote alarms, cellular phone calls, and instant messages. It may also provide for internet connectivity to permit remote control, software updating of the system, data updates, and remote access to a status portal hosted locally or by a remote server farm. The communications interface 11 may also provide communications support for collaborative system software refinement where feedback from the control system is pooled with feedback from other similar systems and used by a service for improving control software which may then be distributed in software updates.

Figures 4A, 4B, 5:
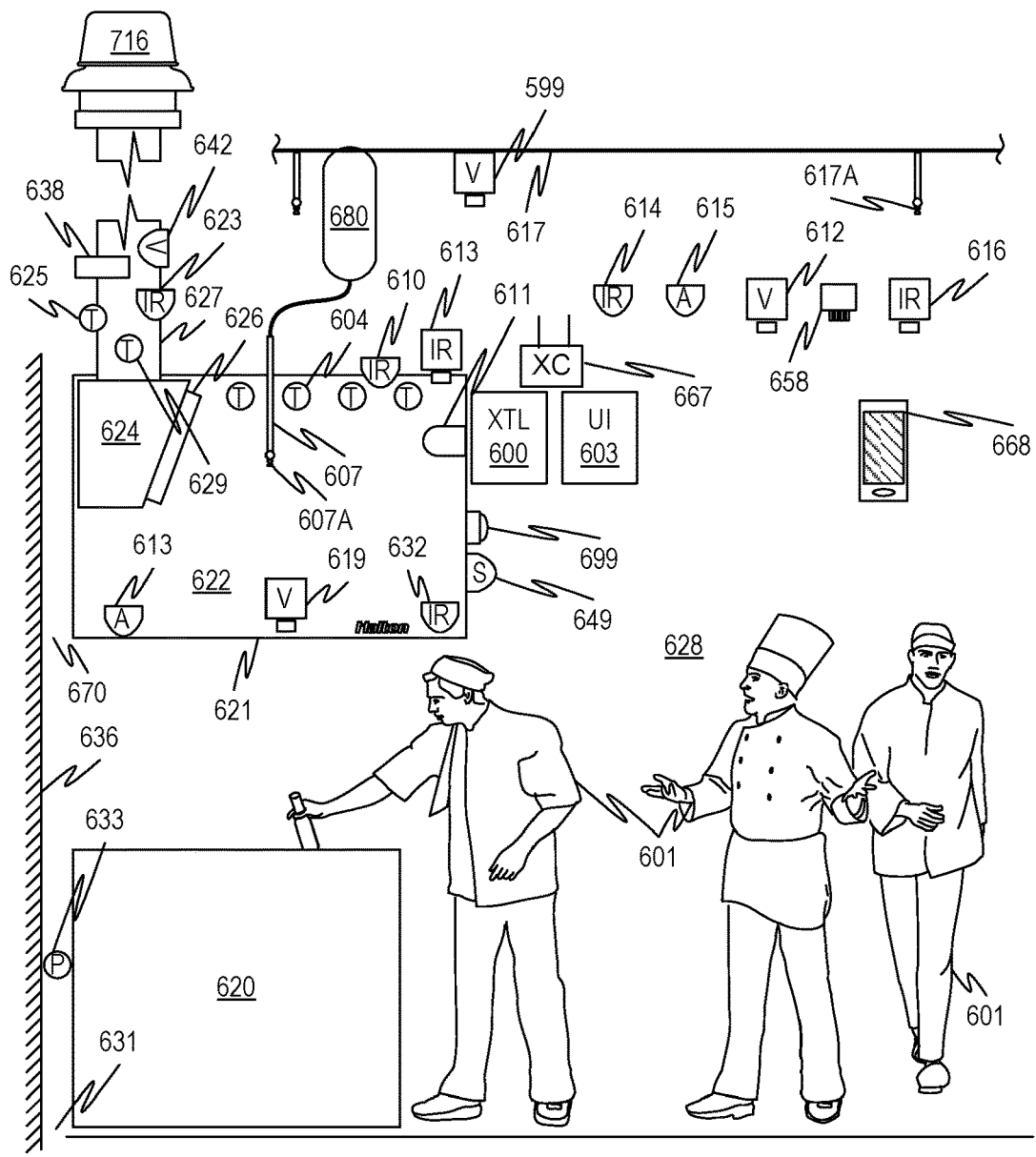
FIG. 4A shows a kitchen with fire detection and suppression elements according to embodiments of the disclosed subject matter.
FIG. 4B shows a plan view of appliances to show a gap between adjacent appliances and a gap between appliances and a wall.
FIG. 5 shows a combined detection and suppression device according to embodiments of the disclosed subject matter.

Referring now to FIG. 4A, an exhaust fan 716 draws air and fumes from a duct 627 connected to an exhaust plenum 624 which supports a filter 626 at an inlet thereof to draw fumes from a recess 622 of an exhaust hood 621. There may be multiple plenums 624, filters 626, and ducts 627 in a variety of different arrangements and the present is shown only as an example. Various sensors are shown which will be discussed below. A fire suppressant such as a chemical suppressant is stored in a pressurized container 680 or other suitable subsystem. A delivery apparatus 607 may include, for example, a spray nozzle 607A. Water sprinkler suppressants, dry or gas suppressants may also be provided.

A fire sprinkler system 617 with sprinkler heads 617A may also be present in a commercial kitchen space 628. The sprinkler heads 617A may have fusible links that open spray valves when heated for a predefined period above a predefined temperature. Various personnel 601 may move around in the occupied space of the kitchen 628 performing various activities including cooking, cleaning, storing, maintaining equipment etc. The personnel 601 may also be involved in fire inspection tasks, fire suppression tasks in the event of fire emergency, evacuation, etc. A cooking appliance, which may be one of many, is indicated at 620. The cooking appliance may generate cooking fumes that are exhausted by the exhaust hood 621.

Appliances 620 are generally positioned adjacent each other with a gap between adjacent ones of the appliances, such as indicated at 630 in FIG. 4B, or adjacent a wall defining a space between the wall and appliance as indicated at 631. Such spaces 631 can be traps for dust, grease, old food, and many other detritus that may fuel a fire and thereby create a hazard.

Figure 2:
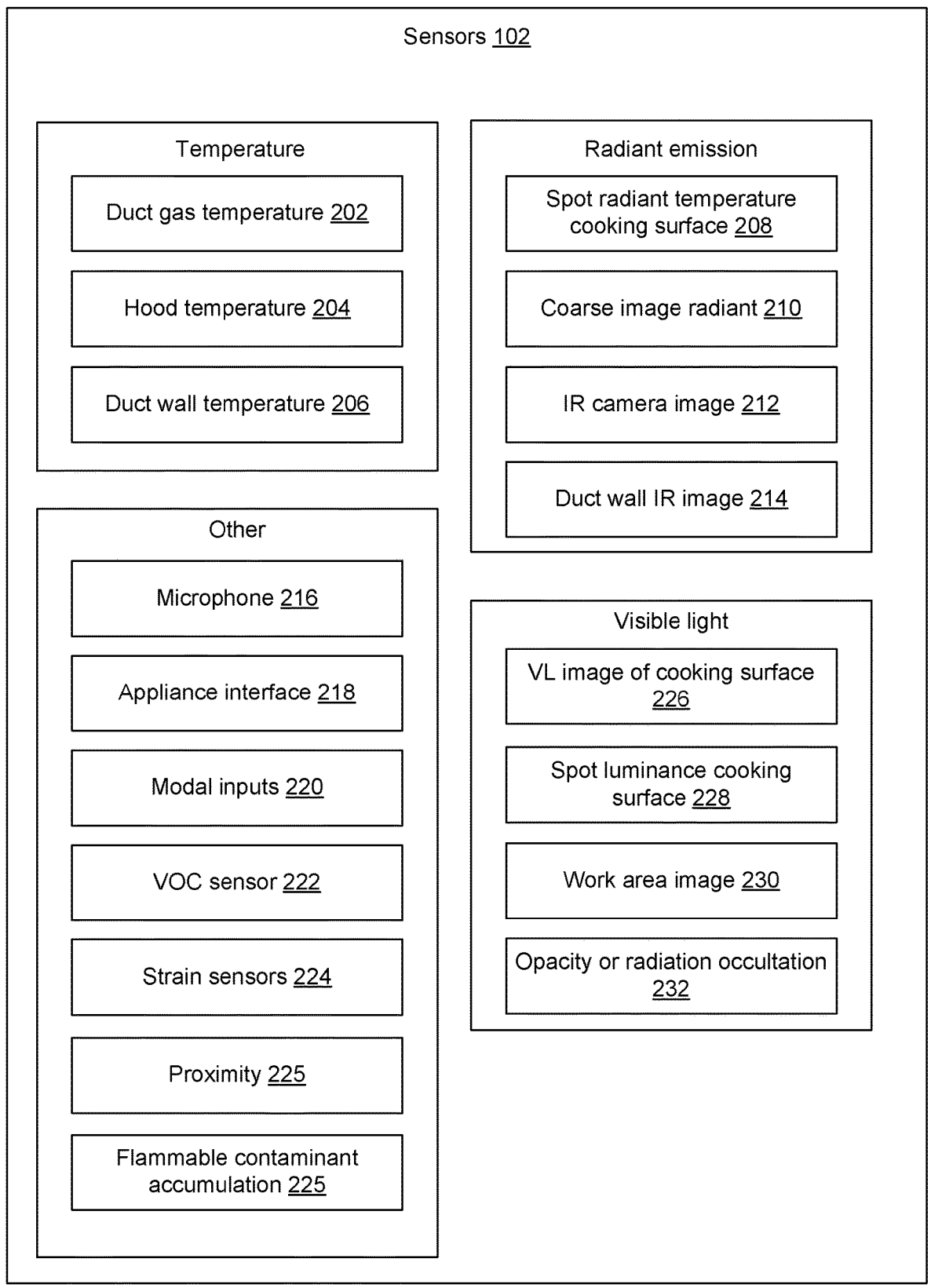
FIG. 2 summarizes examples of sensors that may be employed for one or more of the inputs in the system of FIG. 1.

The controller 108 (600) may continuously or intermittently monitor one or more inputs ultimately derived from the various sensors 100 examples of which are collectively illustrated in FIG. 2. The sensors 100 may include temperature sensors, among them, a duct gas temperature sensor 629 which may be positioned remote from a wall of a duct 627 to ensure it measures the gas temperature continuously and responsively. Various known types of temperature sensors may be employed here and elsewhere in the embodiments disclosed throughout the present application. These may include thermocouples, resistance temperature sensors, resistance temperature sensors (RTDs), quartz oscillator thermometers, thermistors, or any other type of temperature sensor.

The sensors 100 may also include one or more temperature sensors of any of the foregoing types positioned and configured to measure the duct wall temperature at one or more locations of the duct wall as indicated at 625. A duct wall temperature sensor may indicate heat generated from a fire fueled by deposits on the duct itself. For example, in grill exhaust systems, such as wood or gas fired grills, oil droplets or creosote that escape normal filtration may accumulate on the duct walls 627. A burning ember or multiple embers may ignite such a deposit and cause very high temperature fires. These may also be detected by duct gas temperature sensor 629, and/or instances thereof that are located downstream of a location where a duct fire is likely to occur. Generally a filter 626 such as a grease filter will prevent fuel from fouling duct walls 627 but the filters are imperfect. Also burning embers can escape a filter such as a grease-type (impact-type) filter.

One or more temperature sensors 604 may be provided in the recess 622 of the exhaust hood 621. This may provide an early indication of a thermal surge associated with combustion. Exhaust fumes that attend cooking and idle heat-up of a cooking surface such as a grill have a predictable pattern to them. For example, turning meat on a grill can produce steam surges which produces a high volume of fumes but once a cooking mode is established, the exhaust flow may be controlled to ensure the flow rate is at a design rate predetermined to be able to handle such a load. However, when the burning of additional fuel is added to the situation, much higher temperatures may be indicated in the interior of the hood.

Fryers are another source of potential fires. Frying has a predictable temporal pattern for fumes rising in the recess 622 of the exhaust hood 621. When an oil fire occurs, a large increase in temperature may arise within the recess 622 of the exhaust hood 621 in a short time. Providing multiple temperature sensors 604 may permit the position of the fire along a long hood to be determined. The multiple sensors may allow the detection of a temperature length scale as well since a large fire will be detectable by multiple sensors that are spaced apart. The temporal and spatial resolution may both be used to indicate the size and location of a fire.

In terms of processing the temperature information, the temperature fluctuation time scale may indicate the energy of the thermally-driven flow of the fire. A power spectral density function (PSD) cumulatively measured from a fluctuating temperature signal using a low mass temperature sensor may be analyzed to indicate turbulent energy. In a fire, where higher turbulent energy is being generated and manifested as temperature variations, higher frequency components in the PSD indicate higher turbulent energy. Various examples of fires may be analyzed to identify spectral thresholds in the PSD, absolute, or relative, that indicate a fire. Relative thresholds may refer to, for example, a ratio of energy in a low band to that in a predefined band lower than the low band falls below a threshold. Similarly, multiple temperature sensors that are spaced apart by a small distance can reveal high intensity turbulence generated by burning gas in a similar manner. The length and time scales associated with burning may have unique characteristics that may not be characterizable in terms simply of turbulent energy and these characteristics may be experimentally discovered and characterized in terms of a PSD in any event. A coarse representation of the PSD may provide a small number of DOF which may be applied to a classifier for the purpose of detecting fires.

One or more gas species detectors 658 may be provided to sample and analyze the ambient air in order to detect the presence of flammable gas, oxygen levels, carbon monoxide, carbon dioxide, volatile organic compounds, specific volatile organics associated with uncontrolled burning of materials common in kitchen fires, and other gaseous species.

Temperature sensors 604 may be distributed in a rectangular or hexagonal array over a two dimensional field within the recess 622 of the exhaust hood 621. The positions indicated in FIG. 4A are figurative only. As indicated above, the temperature sensors 604 may be used to indicate a slowly varying temperature or fluctuating temperature from which statistics may be derived and used for classification to indicate a fire. Examples of temperature sensors with low thermal inertia are RTDs and thermocouples as well as thermistors.

Radiant emissions, or light energy in the thermal range, may be detected and used for fire detection and/or for discriminating a non-fire condition given indications, by other sensors. of a fire. The sensors 102 may further include one or more radiant temperature sensors positioned and aimed to detect the average temperature of a region (field of view or FOV) as indicated at 610. There may be multiple radiant temperature sensors 610 aimed at multiple regions or FOVs. For example, one indicated at 632 may be directed at a portion of the cooking surface of the appliance 620 while another is positioned to detect flames in the exhaust hood 621 recess 622. The FOV may be narrow or broad. In embodiments, the FOV is selectable. The signal provided by the radiant temperature sensors 610 may be a real-time instantaneous signal from which information may be obtained by the controller form the unsteady signal therefrom.

Figure 10A:
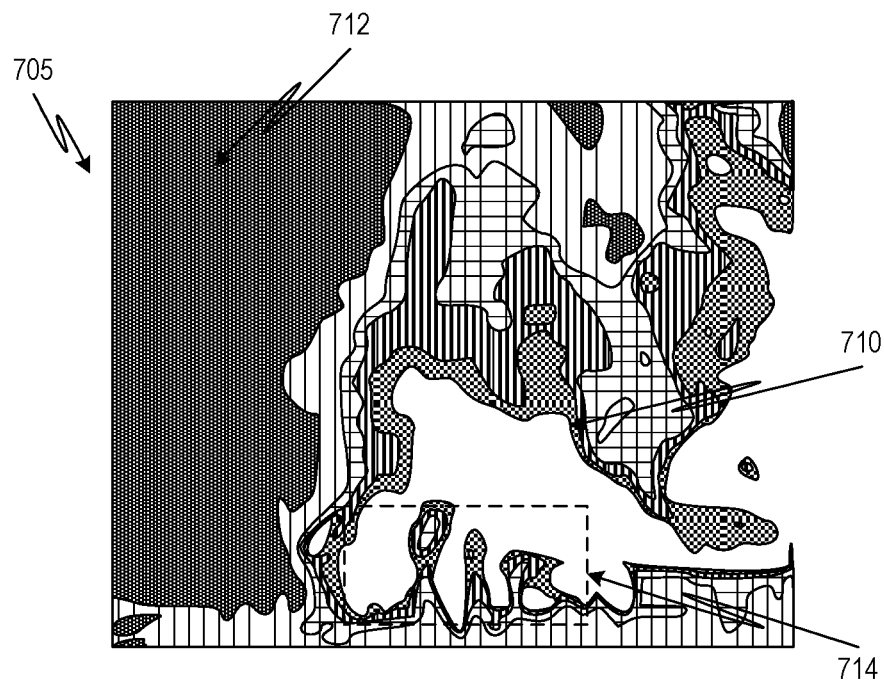
FIGS. 10A and 10B show processed thermal images of a fire and normal cooking respectively, according to embodiments of the disclosed subject matter.
Figure 10B:
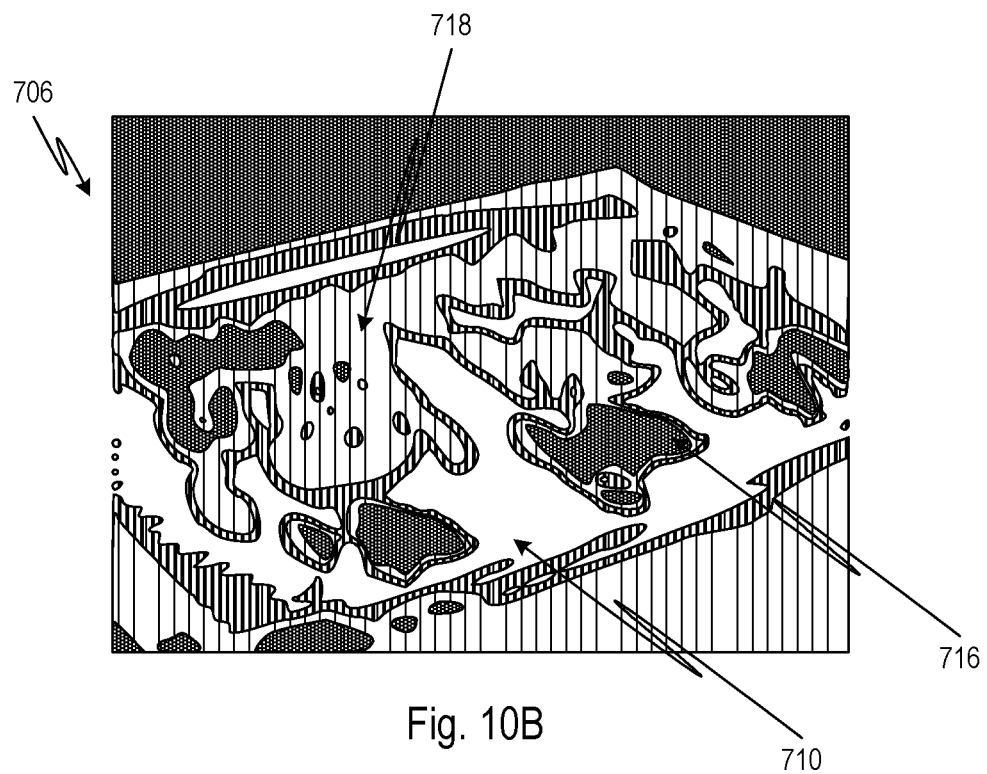

Radiant temperature of a region may be spatially resolved by one or more infrared cameras 613. Referring briefly to FIGS. 10A and 10B, digitally-processed infrared images from different vantages of a fire at a grill station 705 and a normal grill 706 are shown. Various features that can be drawn from blob and fast Fourier transform (FFT) analysis can be seen. First, a high temperature closed region 710 (blob in the image analysis vernacular) is defined by IR luminance thresholding the image. A classifier may detect from the area, shape (simple statistics such as aspect ratio, temporal persistence, and similar features) of the blob may be extracted in the combiner/reducer/classifier 106, optionally in combination with other sensor inputs, to provide an indication of a fire and associated data including confidence level, location, size, and intensity. It may also be observed that a region 714 is characterized by strong spatially-resolved luminance fluctuation which may be distilled as a statistic such as a spatial frequency distribution of the region. As indicated above, the energy in the PSD for a conspicuous frequency band would be very high. Although variations in a similar band are conspicuous and broadly distributed in FIG. 10B, the variation in luminance amplitude is not as high. Further, the latter may not be attended by a temporal fluctuation which as indicated above may be captured in a statistic and applied to the controller.

Figure 13:
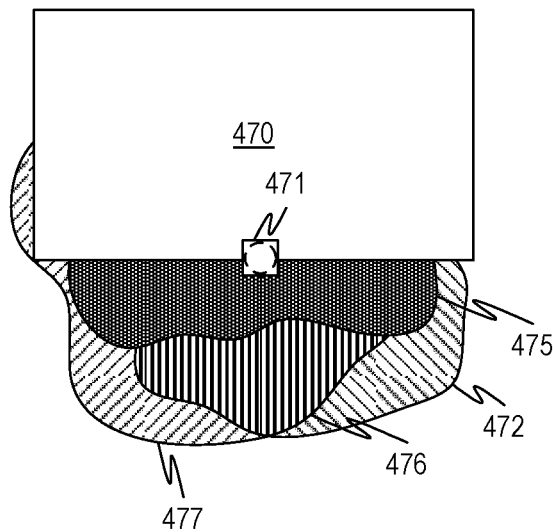
FIG. 13 shows an overhead view of an exhaust hood and camera with detectable fumes according to embodiments of the disclosed subject matter.

An optical or infrared video imaging device may be mounted so as to detect emergence of fire or hot water vapor-containing fumes from a plan view of a hood. The camera 599 may be selected based on a broad range of optical and near infrared frequencies. A recognition algorithm implemented by the controller 108 may recognize the escape of fire or fumes from the hood. Fumes and, of course, fire, should not be visible from above the hood 621 under normal circumstances. The expansion of combustible vapor under the hood forcibly escapes the regulated from of exhaust so that fire and hot smoke can readily be detected. In addition, employing an image or video capture device such as camera 599 for this purpose allows the volume of escaping gases, if not extreme, to be quantified to some extent, in that a radiant temperature and area of a projection of a radiant plume can be quantified with the help of image processing. Referring to FIG. 13, an exhaust hood 470 is shown in plan view with a video camera 471 positioned above the hood to provide a bird's eye view, for example by locating it near the ceiling as shown at 599 in FIG. 4A. The density of the fumes can be determined by subtracting background pattern and level of infrared illumination if the detected fumes are obscuring as, for example, carbon dioxide. Or if incandescent gases heat (fire) are present, they can also be detected in the visible and infrared wavelengths. Using processes established in the fields of image processing and measurement, the magnitude of the opacity or luminance can be quantified for each of multiple regions 472, 476, 475, and 477 by image processing and analysis to provide an estimate of the depth of the fumes for each of the multiple regions 472, 476, 475, and 477, each of whose areas can be also be quantified by image processing and analysis. The design flow rate of an exhaust hood may be sufficient to prevent occasional escape of any substantial plumes of fumes due to occasional fume spikes such as attend water or fat dripping on a hot cooking source such as hot fuel fired grills. In general, any significant breach of fumes would therefore be a result of an unusual misuse of equipment, a fire, or a failure of the exhaust system. In a method, the controller may delay outputting a fire indication or controlling an output effecter such as an alarm or fire suppression system in order to provide time for a manual override to be entered by an operator. The controller may, according to the method embodiment encoded by processor-executable instructions, provide a warning signal indicating that a provisional fire detection has occurred, thereby alerting operators to the need for an override input to prevent an alarm or suppression output.

Video scene classification techniques can be applied to recognize hazardous situations before they actually generate a fire. Classification of hazards can cause a controller to generate a warning using any of the disclosed mechanisms without necessarily or immediately triggering a fire suppression system in response. For example, an infrared image of a blob in a scene, where the hot blob is determined to have a temperature that is rising toward a predefined flashpoint of oil and where no activity is indicated by motion analysis of the scene would be a simple classification problem that could be defined in a classifier by explicit rules or implemented using supervised learning. Such a scene would be an indication of a possible fire waiting to happen.

In an embodiment, such a fire threat warning system may have a thermal video camera connected to a controller. The controller may be programmed to store and execute steps that implement a scene classifier and image processing to simplify features of the scene to permit rapid classification. For example, the classifier may have an image processor applies temperature threshold to successive images of the video signal to identify a hot region of a captured scene and also to generate data indicating a temperature of the hot region. The temperature may be monitored over time and its rate of change estimated to determine if it is changing in a positive direction. The classifier may also estimate motion in the scene. Motion estimation may be provided by ubiquitious compression chips in a straightforward way. The magnitude of motion data in the scene may indicate whether a person is present and in attendance or not. If a person is present and moving around the scene, a warning signal may be delayed relative to a condition where no motion is present. The classifier may generating a hazard signal when motion in the scene is below a threshold and the temperature is above a predefined threshold stored by the controller. The controller may activate an alarm in response to the hazard signal. As described elsewhere, the controller may accept an override command from a user interface and deactivate the alarm responsively to the override command.

FIG. 4A shows an override switch 699 that transmits an override command to the controller 600. Note that an override command may be applied through any type of user interface 603. It may be provided as a simple switch or a more complex user interface that can take a number of forms and also may provide for the input of additional data that may be used to support training of supervised learning algorithm that generates the warning signal or the alarm signal as a result of conditions interpreted by the supervised learning algorithm to indicate a fire. First, a switch such as 699 may be located remotely from a likely location of fire break-out, for example, on a wall near a doorway or at least remote from cooking appliances. This may allow immediate unimpeded access to the switch in the event of a small but quickly contained fire. Another manner in which an override command may be applied to the controller 600 is through a smartphone 668 interface or other mobile interface. In an embodiment, the controller (or a service linked by network to the user interface) is programmed to output information about the provisional fire detection and to request feedback from the user to help disambiguate the conditions that led to the generation of the provisional fire detection. For example, a program for feedback collection to permit further input for supervised learning may generate a selectable list of options may be generated on a display, for example, ☐ small fire contained manually; ☐ no fire, unknown cause of provisional fire detection; ☐ no fire, known cause of provisional fire detection-faulty detector; ☐ no fire, known cause of provisional fire detection-unusual event (e.g., such as construction, crowd of people moving in kitchen); ☐ no fire, unknown cause of provisional fire detection. The program for feedback collection may further prompt for more information conditionally based on the responses to the selections. The training of supervised learning algorithms can still be advanced by simple override signals.

Figure 7:
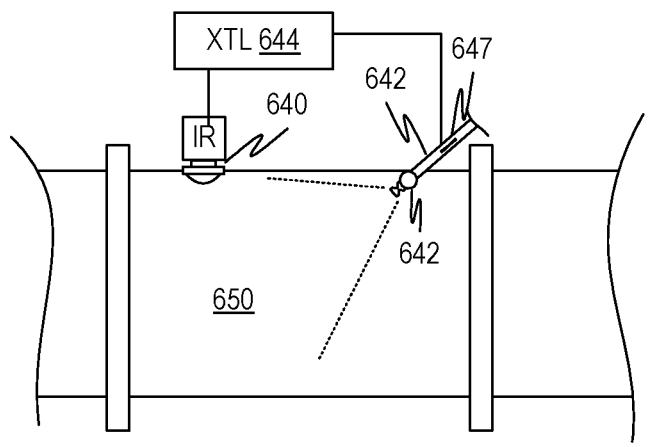
FIGS. 7 and 8 show duct sections with a fire detection and suppression system according to embodiments of the disclosed subject matter.
Figure 8:
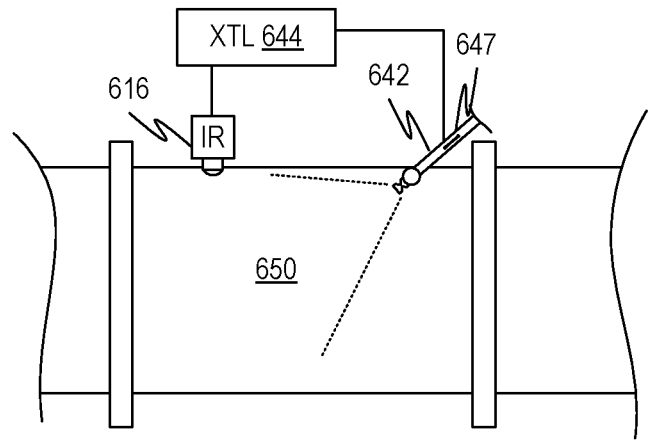

Spot radiant temperature or imaging may also be used in a duct. FIG. 7 shows a modular unit 650 that can be supported on a pipe or other support 653 installed in a duct to detect burning embers floating therein using an infrared camera 640 with a wide-angle lens for a broad FOV. A connected controller 644 performs image processing on the real-time images and controls a valve 647 to generate a brief spray from a nozzle 642 to snuff the ember or embers. The nozzle 642 may have a pivoting head to allow the aim to be optimized upon installation. The spray may be a water spray of a dry or gaseous suppressant. The same apparatus may be installed in installations other than ducts. For example, a self-contained apparatus as shown in FIG. 5 for identifying small fires or burning embers may be emplaced near an area at risk for such. Here an example is shown mounted on a pipe for supplying water in this example. A pivoting nozzle 654 is tilted by actuators 652 and 651 through two axes of motion. A wide angle infrared camera 650 may identify targets and apply suppressant locally to a region in its field of view. Because the wide angle infrared camera 650 is co-located with the pivoting nozzle 654, any fire or flame that is in the FOV will be addressed by the cone of spray emitted by the pivoting nozzle 654, by mapping the FOV properly to the actuation of the pivoting nozzle 654. Note that in addition to burning embers, the infrared camera 650 may also indicate burning material accumulated on the wall of the of the duct and use a fire suppression spray to halt it.

The narrow targeting of an incipient fire breakout is an advantageous feature of a fire suppression for multiple reasons. First, fire suppressant can damage a protected facility such as a kitchen or at least create hazards and a costly clean-up problem. So, the confinement of suppressant to the areas that need it is a desirable feature. In addition, because of the problems created by the use of suppressant, it may cause facility managers or employees to be reluctant to permit the system to engage fires when detected. Fire suppression may be defeated or the system's responsiveness diminished (by manipulation of set-points and such) by personnel reluctant to suffer its consequences. Another example is where the only option available to personnel is to pull a manual fire switch or confirm the presence of a fire detected by a fire detection and control system. So, narrowly targeted and limited application of suppressant, such as by means of embodiments like those of FIGS. 5 and 7, can reduce these concerns.

The controller 600 may be connected to a remote or mobile UI, such as a smartphone 668, by means of a communications module 667. The communications module 667 may be a network or Internet interface such as a modem and may include a router or switch. The communications module 667 may be a transceiver and the mobile UI, a radio terminal.

Figure 11:
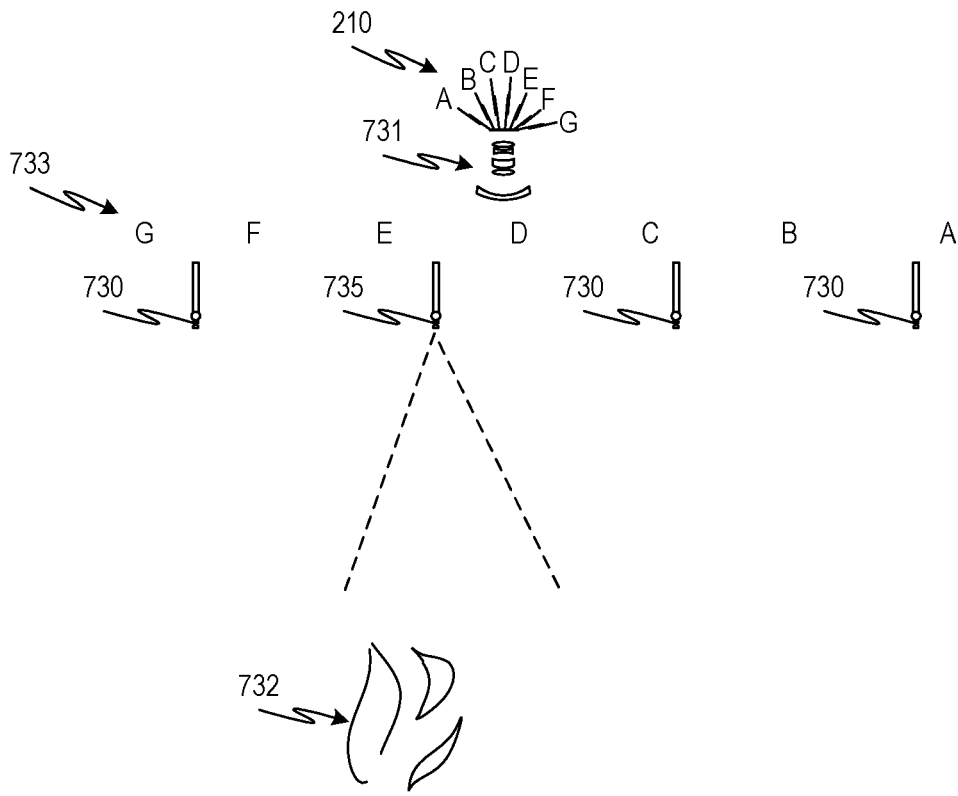
FIG. 11 shows an application for a coarse thermal imaging system, according to embodiments of the disclosed subject matter.

A type of sensor that lies between the spot radiant temperature sensor 208 and an infrared camera 212 is a coarse image radiant sensor 210 that gathers only small number of pixels with a course sensor. Such a sensor may have a ten-by-ten matrix of infrared sensors. The coarse image sensor 210 may have built-in image processing functionality and may produce a low-bandwidth data stream that can be filtered more easily in real-time. The resolution may be selected to detect variation in a luminance FOV such that it can detect up to certain frequencies that correspond to a threshold and no higher. Thus, image processing capable of identifying the energy in a region such as 714 may be provided without greater resolution. The coarse image radiant sensor 210 may also allow the localization of hot regions to be targeted by a selected fixed nozzle or by aiming a movable spray nozzle. FIG. 11 shows an arrangement in which the coarse image radiant sensor 210 with a wide angle focusing optics 731 (which can be simpler in alternative embodiments (e.g., a Fresnel lens) due to the low resolving power of the sensor) is used to control an array 733 of separate nozzles 730. When a fire 732 is detected in a zone (one of zones A, B, C, D, E, F, G), the fire being located in zones D-E which is indicated on the coarse image radiant sensor 210 region D-E, then a controller opens the nozzle corresponding to that region, namely nozzle 735. The coarseness of the infrared detection averages the luminance over a region with minimal image processing. In this embodiment, the principle of localized and limited application of suppressant may be applied.

In some embodiments, other means by which suppressant may be limited include staged application where a first type of suppressant deemed more innocuous than a second is initially applied and the second type of suppressant is only applied after the detection system indicates a failure to provide complete control. An example of an innocuous suppressant may be water, and a less innocuous one may be a foam chemical suppressant. Another means by which suppressant may be limited is by feedback-mediated application of the suppressant such that as suppressant is applied, the effect on the fire is assessed and the quantity of suppressant is limited to an amount required to diminish the fire condition to a predefined detected level. Still another control method may include the predictive application of suppressant where the total quantity of suppressant is responsive to an indication of the size of the fire. This kind of control algorithm may be identified as a feedforward control.

In some embodiments, sensors responsive to light in the visible spectrum may be employed in the fire detection and suppression system as well. FIG. 2 shows examples of sensors including visible light imaging of the cooking surface 226 which may be obtained by a visible light camera 619, for example. The spot visible light luminance (non-imaging) of a region of a cooking surface 228 may be detected by a photosensor 613, for example. The latter may have focusing optics or a light guide to shield light from outside a FOV from being received by the photosensor 613.

Spot luminance detection received from the cooking surface 228 may also provide useful input for detection of certain types of fires such as grease fires or where grease and water are accidentally combined. These can create a large flare that generates light and heat radiation that is distinguishable also in terms of its temporal profile. The combination of these two signatures, a luminance and thermal spike can be more informative than either alone, since a visible light spike can potentially be caused by reflection of a light source.

The occupied space of the kitchen 628 can be imaged 230 continuously by a visible light camera 612 and/or by an IR camera 616. One or more visible light cameras 612 and/or IR cameras 616 may be positioned in the kitchen to monitor the region adjacent an appliance such as appliance 620. Additional or alternative One or more visible light cameras 612 and/or IR cameras 616 may be positioned to monitor a various discrete locations around a kitchen such as adjacent multiple appliances, doorways, occupied regions, mechanical systems components such as fan motors, ventilation registers, spaces above hung ceilings, interior wall spaces, the gaps between appliances such as indicated at 630 and gaps between appliances and walls such as indicated at 631. See FIGS. 4A and 4B.

Video compression provides a variety of simple and fast mechanisms for reducing the data in a kitchen scene to extract data indicating an activity level. The activity level may be combined with other information such as the contemporaneous audio content (from a microphone 615) to allow the detection of a human fire response or panic by occupants of the kitchen 601. In a simple embodiment, the block compression may discard high color depth and high discrete cosine transform (DCT) coefficients and perform motion estimation on the decimated blocks to provide an estimate of the total motion energy in the scene as an indicator of activity level, its randomness or directionality, features which applied to a classifier may discriminate scenes that contain panicked or purposeful behavior that attends an emergency from other normal activities. In this manner, the controller can infer the presence of a possible fire from the reactions of kitchen workers. As indicated, this information in combination with other information such as infrared sensors aimed at a cooking surface may provide high-confidence estimates of the presence of a fire. Again, this is only an example. Here again, the selection of the dimensions of the input feature space is important to prevent problems such as over- or underfitting.

An IR sensor 614 may also be positioned in the kitchen to monitor the region adjacent an appliance such as appliance 620. Additional or alternative IR sensors 614 may be positioned to monitor a number of discrete locations around a kitchen such as adjacent multiple appliances, doorways, occupied regions, mechanical systems components such as fan motors, ventilation registers, spaces above hung ceilings, interior wall spaces, the gaps between appliances such as indicated at 630 and gaps between appliances and walls such as indicated at 631. An IR sensor can also be positioned to detect radiant temperature in a duct by an IR sensor 623 positioned in a duct or to detect infrared light emanating from a source within the duct as indicated by IR sensor 623. Such a sensor may be replaced by an IR camera as well. The IR sensor 623 or IR camera may detect burning embers for example.

Opacity or radiation occultation sensors 232 such as used in smoke alarms can also provide relevant input to a signal combining controller as discussed. For example, an opacity or radiation occultation sensor 649 may be positioned outside a hood to detect a significant smoke breach. The occultation sensor 649 receives light from ambient or a particular source within it or close by to establish a baseline level of received light intensity. When smoke enters a space between the light source or sources and the light sensor, an output signal level indicate the change in opacity of the space between the light and the sensor. A variety of devices may be used for a light sensor such as photocells, charge-coupled devices, photomultipliers, and camera sensors. The controller may be configured to detect a duration of high smoke levels and trigger based on both duration and opacity or a combination thereof. As discussed, this signal may be combined with others to identify a fire, locate it, and determine its size in combination with other factors. In some embodiments, smoke may absorb visible or thermal radiation so that it may be used as an inhibitory signal in combination with either or both of these signals in the controller response.

Other types of opacity or light-blockage sensors such as used as optical tripwires in security systems, can be used to detect the accumulation of debris. For example, such a blockage sensor 633 may be located in narrow spaces or areas that are normally hidden from view or hard to inspect which may be cleaned infrequently. An example is shown of a space behind appliance 620 adjacent a wall 636. See also FIG. 4B and gaps 630 between adjacent appliances and gaps 631 between a wall 601 and adjacent appliances 620. Similar gaps where debris or dust may accumulate are gaps between adjacent exhaust hoods or between a wall and an adjacent exhaust hood such as indicated at 670 in FIG. 4A. Note that gaps can exist between exhaust hoods that are not adjacent a wall, for example, so called canopy hoods can in installed such that gaps exist between them where debris can accumulate.

Figure 3A:
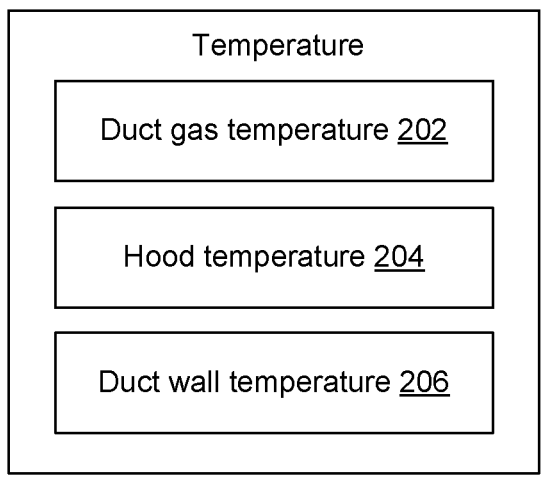
FIGS. 3A-3F shows initial conditioning of different types of sensor signals and further processing that may be used to reduce the dimensionality of the primary signals while providing meaningful information to a classifier of a controller.
Figure 3A:
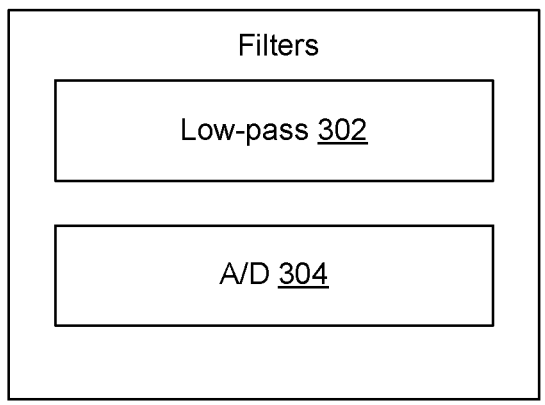
Figure 3A:
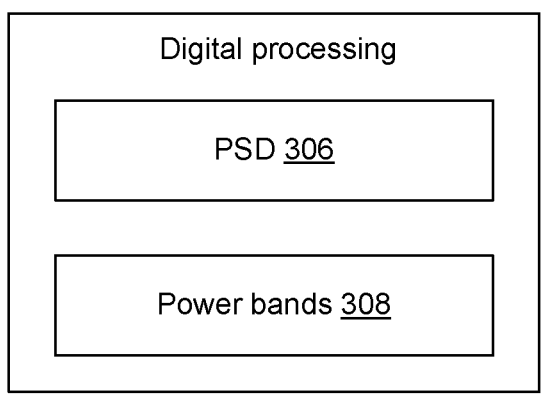

Referring now to FIG. 3A, temperature sensors of all types such as duct gas temperature 202, hood temperature 204, and duct wall temperature 206 may be filtered by a low-pass filter 302 before being sampled for conversion to a digital signal for further processing. The low-pass filter 302 may be an analog filter for anti-aliasing. Digital processing of the temperature signals may include the generation of a continuously updated PSD function 306 based on an averaging kernel such as a Guassian so that the PSD function represents a near-term statistic representative of the contemporaneous distribution of variation in the temperature signal. A simpler type of processing of power bands 308 may be used to detect fluctuations such as by a digital filter that indicates when the temperature changes faster than a predefined rate or contains frequency energy in a particular band or energy in multiple bands. These may be applied as independent DOF signals to the controller. Fluctuations in temperature such as will be indicated by such digital processing may distinguish cooking from a fire. For example, when heat is generated in a turbulent flow such as a fire versus steam-driven plug flows that result from turning food on a grill, the frequency characteristics in terms of magnitude and wavelength will be characteristically different. Higher temperatures generate higher velocities (and higher Grashoff numbers) and therefore higher frequency energy in the thermally induced turbulence. So, the information content of the unsteady temperature spectral components can cooperate with other parameters to distinguish normal states such as cooking and preheating of cooking appliances from abnormal fires where uncontrolled combustion occurs.

Figure 3B:
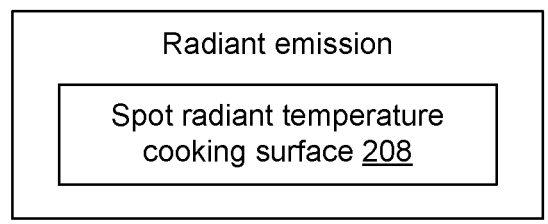
Figure 3B:
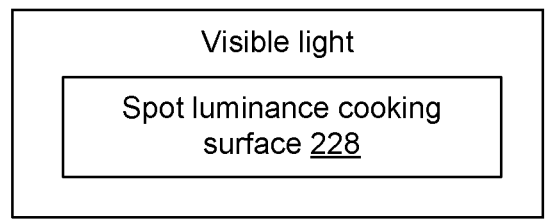
Figure 3B:
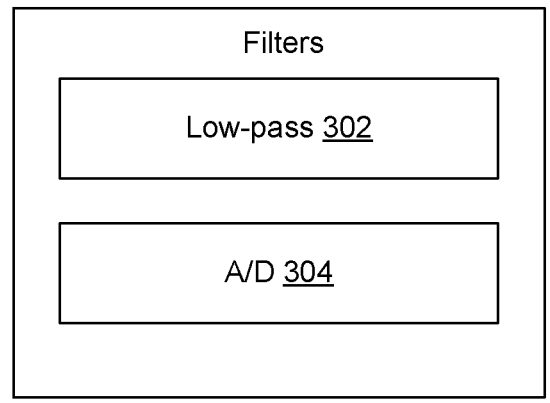
Figure 3B:
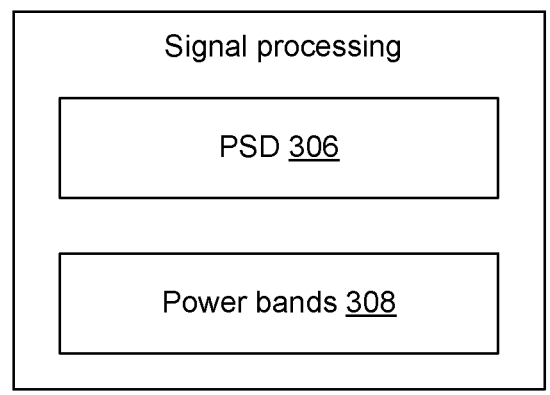
Figure 3C:
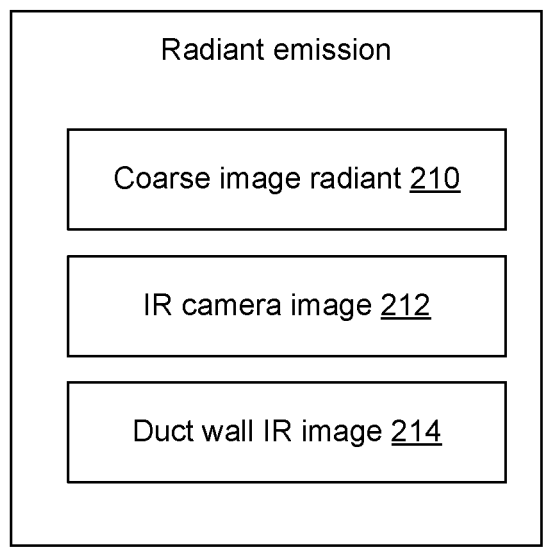
Figure 3C:
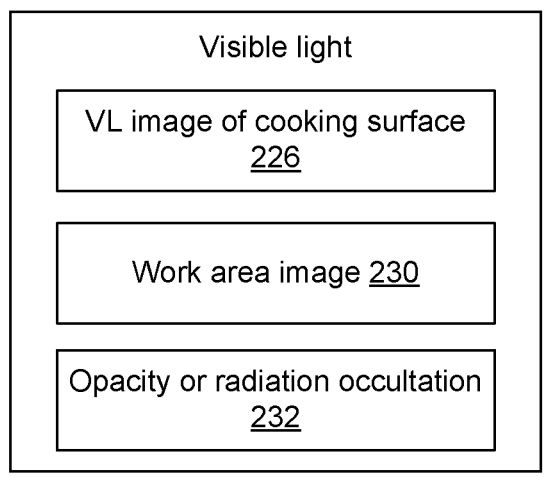
Figure 3C:
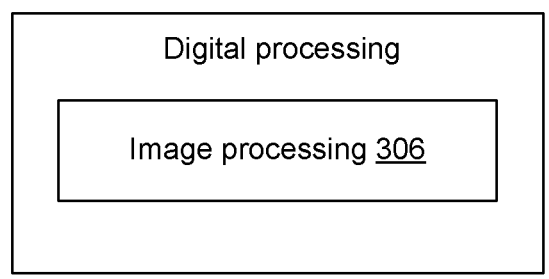

Radiant energy such as radiant temperature 208 and visible light 228 signals indicated in FIG. 3B may be processed in the same manner as temperature signals described with reference to FIG. 3A. Here again, the spectral information of the time varying signal as well as the running steady state signal are relevant independent DOF signals that may help to discriminate normal processes and events, in a cooking environment, from fires. Again, this information may be combined with information from other sensors to influence a final determination of the presence, location, type, and intensity of a fire. Here again, the frequency distribution of the fluctuations of radiant energy may carry information about the energy in a thermally-driven or uncontrolled combustion-driven flow. Smoke indicated in visible light or radiation occultation sensors may produce a time-varying mask that cause infrared light to be variably absorbed by the smoke (a fluctuating mask effect where the changes in masking are driven by the same turbulent effects and may therefore also indicate turbulent energy). Changes and fluctuation in radiant temperature of a cooking surface may indicate the turning or emplacement of food on a grill or the movement of hands or kitchen tools or cooking vessels over the cooking surface. Such fluctuations would be attended by sporadic drops in radiant temperature and low steady-state luminance unless attended by a fire so the combination of these three signals are useful for the detection and discrimination of fire from more normal events in a cooking context.

Image information, as discussed above, may be automatically processed to provide inputs for the controller that contribute to distinguishing fire from other events. Thermal imaging may be done using a coarse thermal imaging device 210 as discussed with reference to FIG. 11. As indicated, this may provide location information covering a large area with a single sensor rather than multiple radiant sensors. An infrared camera 212 may also cover a larger area and provide further relevant information as also discussed above. A duct wall imaging device 214 that forms thermal images of the interior of a duct wall may be provided at one or more locations of a duct as discussed with reference to the embodiment of FIG. 7.

Further transient and stable shapes defined by radiant temperature variation with luminance or color level decimation (e.g., a posterization filter, a threshold filter, and/or a boundary-delineating filter) may be recognized and classified to distinguish as characteristics of normal and fire conditions. Such image processing may be done digitally by various known methods by implementing an image processing 306 component to the conditioning of the image signals from the various imaging devices discussed above (e.g., coarse thermal imaging device 210, infrared camera 212, duct wall imaging device 214, etc.).

In some embodiment, sensors such as used in smoke alarms 232 may be filtered to produce spectral information as discussed above. The time variation of the signal is a direct reflection of the turbulent energy in the air flowing past the sensor with the smoke acting as a tracer. Here again, the range of higher frequency components in the time-based signal produced by combustion or high temperature thermally-driven flow may be used for the identification of a fire and its location. Although FIG. 4A shows a single opacity or radiation occultation sensor 649, multiple sensors may be used around a kitchen to help provide location information. Thus, the controller may compare the spectral information at the various locations to determine by interpolation where the peak intensity of the fire is located within the kitchen.

Figure 3D:
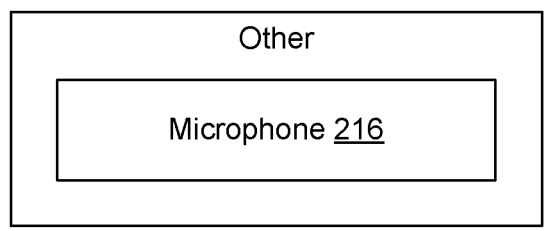
Figure 3D:
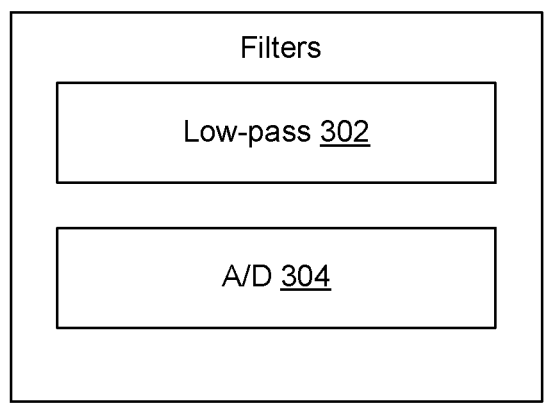
Figure 3D:
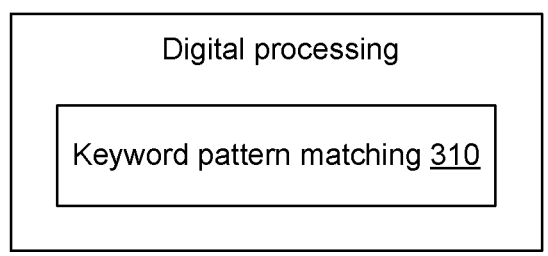

Referring now to FIG. 3D, the audio signature of a fire can be generated by a microphone 216 with suitable processing and analysis of the primary audio signal, for example, by low-pass or band-pass filtering 302 and conversion for digital processing 310 by analog to digital (A/D) conversion 304. The audio signal can recognize the pattern of a fire's sound or recognize the words spoken by occupants to develop an indication of a fire and characteristics thereof. Fires generate sounds that can be detected and this information can be used to indicate the size, location, and type of the fire. Microphones 216 can be placed around occupied zones as well as unoccupied zones to detect the sounds in such zones. Even non-verbal sound that cannot be converted to words can be an indicator of emergency situations such as a fire. Screams or shouts can be distinguished by sophisticated or simple pattern matching 310. The sounds of people engaged in emotionally-charged cooperative or panicked behavior have machine-recognizable features that can be reduced and provided to a local controller to facilitate appropriate action. See for example US patent publication US20080309761 to Kienzle, et al. Speech to text engines can be employed and these need not be locally processed, for example, speech can be transmitted over network channels such as the internet to be processed into symbolic information indicating the content or meaning of the speech which may be returned to local controllers for response. In addition, the audio recognition of a fire can provide useful input for fire fighters as described in U.S. Pat. No. 7,953,228 to Faltesek, et al.

Figure 3E:
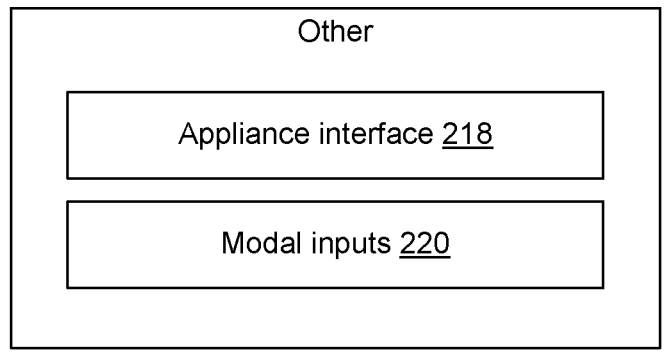
Figure 3F:
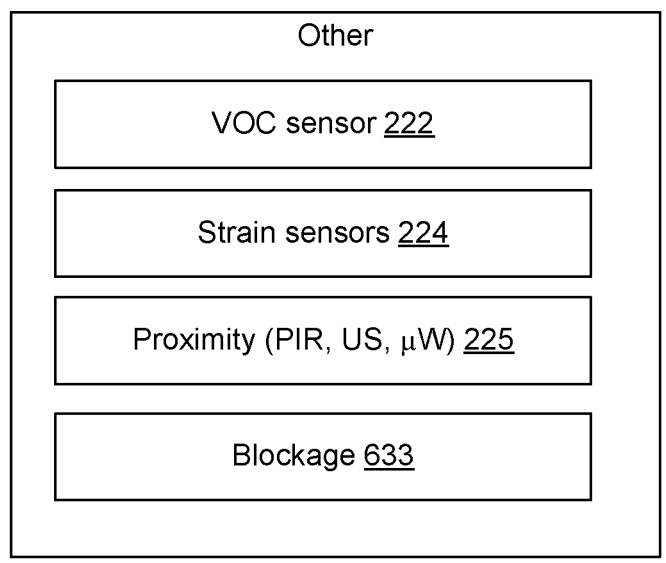
Figure 3F:
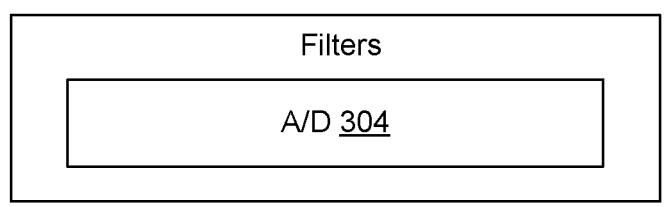
Figure 3F:
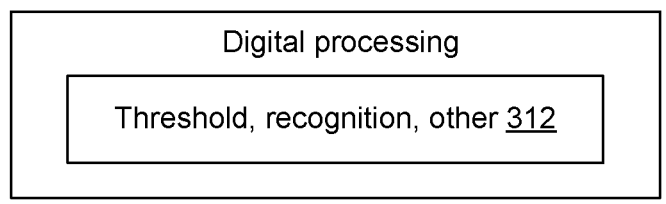

Referring to FIGS. 3E and 3F, modal inputs from appliances 218 and/or manual user inputs 220 may be provided to a controller for controlling actions. In an embodiment, a requirement for an operator to be present may be enforced by the system where appropriate. In this embodiment, a type of fuel being used in a cooking operation may be solid fuel which may require the continuous monitoring and presence of an operator (e.g., a cook or other personnel) for safety reasons. This solid fuel cooking mode information may be combined with imaging from, for example, visible light camera 612 or audio signals from microphones 615 which may be processed to determine if this requirement is being met. If continuous presence is not maintained, an output signal may be generated or some other ameliorative action may be invoked, such as the suffocation of the fire by the reduction of combustion air, or other actions such as initial suppression of a staged fire suppression sequence. Image processing and recognition for detecting the presence of personnel is a mature technology. For example, U.S. Pat. No. 6,611,206 to Eshelman, et al. describes body habits, human presence recognition, etc. These technologies have been used also by security systems for many years. For example, Honeywell offers video surveillance technology for monitoring the activities of people in busy locations.

In some embodiments, other types of sensor signals may be used and converted 304 to digital for detailed processing such as simple digital filtering up to complex event recognition (classification). Volatile organic compound (VOC) sensors may be used to detect the presence of products of smoldering, or inefficient uncontrolled fires can be revealed by the presence of aromatic hydrocarbons such as ethane, methane, etc. For example, smoldering refuse can emit such VOC. As discussed, the signal from a VOC sensor can be combined with other signals to determine the presence or incipient formation of fires at an early stage or even the presence of a hazard that has yet to become a fire. An electronic nose can provide a profile of the mixes of gaseous species which can further be used to recognize fire risks as well as fires. For example, flammable vapors can be detected. A strain sensor 632 in equipment or architectural elements that may change shape due to ununiform or high temperature heating may act as indirect indicators of the presence of an uncontrolled fire. Strain sensors can be included in appliances, hoods, lighting fixtures, working surfaces, ceiling panels, light reflectors, and other elements that are present in an occupied area.

Figure 9A:
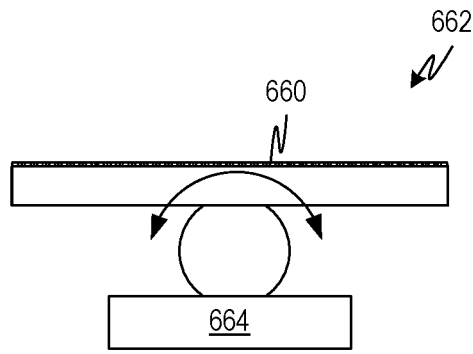
FIGS. 9A-9C show a fire simulation device according to embodiments of the disclosed subject matter.
Figure 9B:
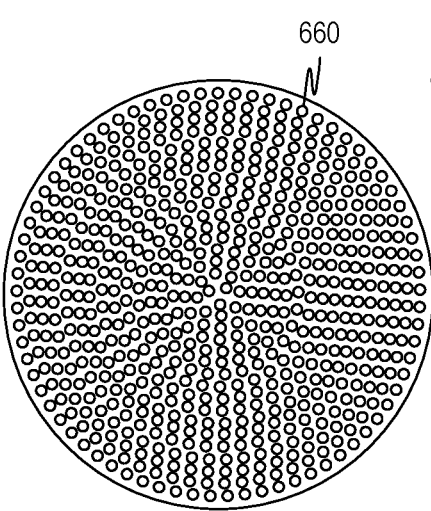
Figure 9C:
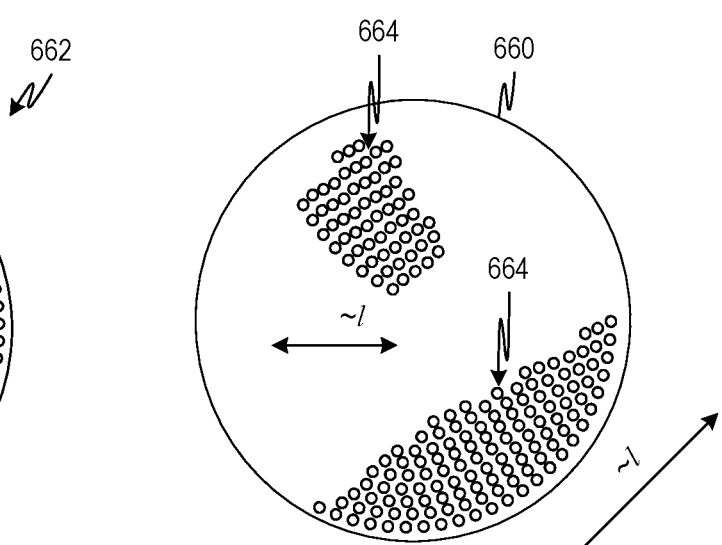

FIG. 9A shows a side view of a display device 662 with a display panel 660 that can be aimed in selectable directions by pivoting on a base 664 to allow the display panel 660 to be aimed at a sensor or imaging device to evaluate a control system's response to it. The display may emit radiation of a controlled luminance in a selected range of colors or wavelengths including visible and/or infrared. Patterns shown in a face-on view in FIG. 9C, FIG. 9B simply showing in the same view with no pattern being projected, can simulate a pattern of a fire. Here, blobs 664 may move about, change shape and speed, etc., to simulate the image of a predefined type of fire. In an embodiment, the display panel 660 simply displays a video of a real fire. In embodiments, the display has an array of high power directional infrared sources. The patterns of blobs 664 (zones characterized by a distinctive change in luminance or color) and their motion and size and shape change can be statistically characterized by characteristic time (~t) and length (~l) scales commonly used in the statistical description of stochastic phenomena such as turbulent or burning flows. The blobs may also appear and disappear. In a use case, the display panel is tilted so that it's normal points toward an imaging device. The display panel 660 size may be selected to cover the FOV of the imaging device or greater than that. Other features can be displayed such as a simulated burning ember, simulated smoldering debris, etc. The display device 662 may be used for testing and for calibrating the system in real-world installed conditions. The display device 662 may be set up during normal kitchen operation to test the system during actual working conditions as well.

FIG. 4A also shows a grease sensor 638 which is described in U.S. Pat. No. 8,487,776 to Livchak, et al. The patent describes a variety of different devices that detect the accumulation rate (or predict it from accumulation of a sample) on a duct wall to determine if a duct presents a risk of a duct fire. In embodiments, a fouling detector estimates a magnitude of fouling on a duct surface by measuring fouling on a surrogate (non-duct) surface of the sensor. This is accomplished by measuring the amount of light returned to a light sensor from a light source from the surrogate surface which is exposed to the contaminating fume stream. The signal from such a device may be applied to a controller for combination with other data to determine whether a fire is present, imminent, or at risk of occurring.

FIG. 4A also shows hood lighting 611. In embodiments of the disclosed subject matter, the hood lighting fixture 611 can be flashed, its intensity varied, or its color changed to indicate a condition such as a fire hazard, an incipient fire, or other alarm conditions. Colors emitted by the lighting fixture 611 may each correspond to a condition or level of risk. For example, the color may change to a yellow color or change between normal and yellow in a flashing fashion to indicate a risk while it may do the same with red if a more urgent condition exists. A risk condition may be the absence of an attendant at a station covered by a hood, for example, where solid fuel is used. Another risk might be the blockage of a blockage sensor such as blockage sensor 633 caused by accumulation of debris. Thus, the color functions as a warning indicating an action should be taken. An urgent condition may be the detection of a fire breakout at a nearby location. These signals may be combined with textual output on the user interface 603 explaining the meaning and type of warning and the action to take.

Figure 6:
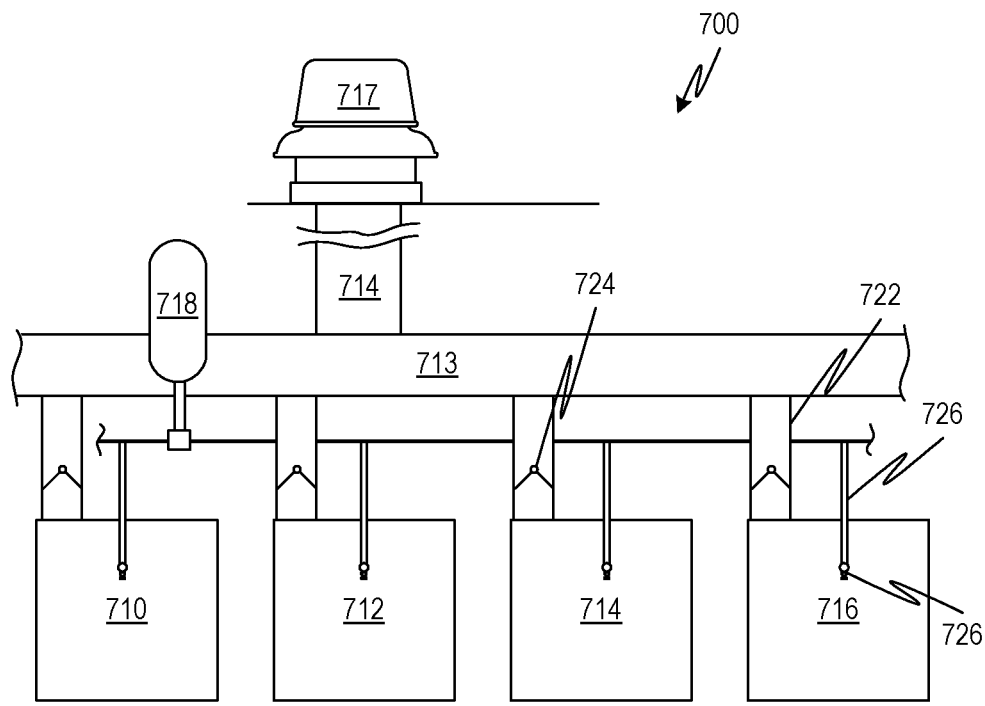
FIG. 6 shows a multiple exhaust hood fire suppression system according to embodiments of the disclosed subject matter.

FIG. 6 shows a kitchen exhaust system 700 with multiple hoods 710, 712, 714, and 716 all connected to a common plenum or duct 713 from which air is drawn by a fan 717. A fire suppression material contained under pressure in a vessel 718 is sprayed on a fire from a respective one or more nozzles 726, fed by a distribution header 720 and drops 726, at a controller-selected location of the fire. Any of the detection systems described herein may be used to control the suppression response and which nozzle 726 is opened. The flow of air from the hoods 710, 712, 714, and 716 to the plenum or duct 713 is regulated by dampers 724, each respective to one of the hoods 710, 712, 714, and 716. The dampers 724 may be of a type that is suitable for high temperatures, that are regulatable for exhaust flow balancing among the hoods 710, 712, 714, and 716. Where the hoods 710, 712, 714, and 716 are connected to a common exhaust duct or plenum, each hood 710, 712, 714, and 716 must be balanced against the others so that each exhausts at the minimum rate that ensures full capture and containment of the contaminants. Ducts carrying grease aerosol can have specially adapted dampers able to deal with the hazards caused by grease precipitation. A suitable configuration for the damper 724 is described in US Patent Application Publication No. 2015/0300653 to Livchak, et al. This damper is continuously variable, grease tolerant, sturdy and heat resistant, as well as capable of completely sealing off the duct 722.

In a fire response, various actions can be taken by coordinating the opening and closure of selected ones of the dampers 724. In a first response to the detection of a fire, all of the dampers are opened and the fan 717 flow rate is increased to a maximum. This response focuses on removal of fumes. The latter response may be responsive, by the controller, to a certain type of fire, for example one characterized more by the generation of dangerous or poisonous smoke than by the risk of flashover. In another response, a different type of fire may be better controlled by drawing fumes from the immediate location of the fire and directing all suction to this location by closing all but one damper 724. These two responses highlight a value of highly discriminatory detection systems using sophisticated classification techniques based on multiple sensor inputs with appropriate filtering as described in the various examples given herein. The activation of the dampers may be controlled responsively to a location and type of fire. A fire that generates dangerous smoke may be characterized by low heat and widely distributed opacity and other data such as audio with word recognition or recognition of choking, motion compensation table data indicating panic, VOC detection, low temperature or confined elevated temperature field, and/or other parameters. A fire that presents a risk of spreading may be characterized by the same features with different values and combinations of values. In a type of fire prone to spreading, the controller may open the damper closest to the fire and close those remote from the fire so that the suction of other dampers does not assist the fire in spreading.

Referring to FIG. 3G, as described above, a variety of conditioned digitized, and reduced signals may be applied as inputs to a signal combiner implemented in a software program on a processor 105. The classifier may output symbols indicating multiple recognized classes and confidence levels for each of the classes which may be further reduced to a signal commanding one or more actions by one or more output effecters 107. The classifier and upstream and downstream processing may be performed by a controller 600 (FIG. 4A) or at least partly by a remotely located controller implemented on a network or an internet connected server.

Fires may be classified by exploiting stored information on data storage devices located locally or remotely. Classifiers are known that employ supervised learning to generate classes and associated confidence levels. These can be used to detect fires. Sensors actively monitor different indicators. The controller stores data samples from the different sensors. The system determines a likelihood of whether a single sensor output or combination thereof, or a reduced indicator therefrom such as a running statistic, alone or in combination with other data indicates a fire. The system may employ stored information from many locations and developed over a period of time to improve its responsiveness and its ability to eliminate false positive detections. The confidence levels may be multiple, with each being associated with a single sensor or sub-combination with the controller calculating a combined confidence level. Alternatively, a single confidence level may be developed from the joint probability of all of the inputs combined, such as provided by a network classifier. Other types of combiners/reducers/classifiers 106 may be employed such as fuzzy logic, neural network evaluation, rule-based systems, Bayesian classifiers, model-based classifiers, unsupervised learning algorithms, etc. Different alarm types and levels may be generated in response to a fire or risk conditions responsively to the system one or more confidence levels.

The sampled values of the various inputs, the reduced data derived from them, and various other data such as received from appliances, input by users (modal data) and algorithms and models are stored in data stores and/or memory to provide access to them by the classifier. The stored data may also include reference values for thresholding, image processing filters, and other data.

Confidence levels are inherent in probabilistic classifiers such as Bayesian classifiers. Rule-based classifiers may include hard confidence levels for each output. Rule-based models may also calculate confidence levels using formulas, for example the confidence may be taken as a logarithm of the discounted product of the confidence levels of each of multiple independent inputs (independent DOFs) or a vector dot product of these.

Figures 12A, 12B:
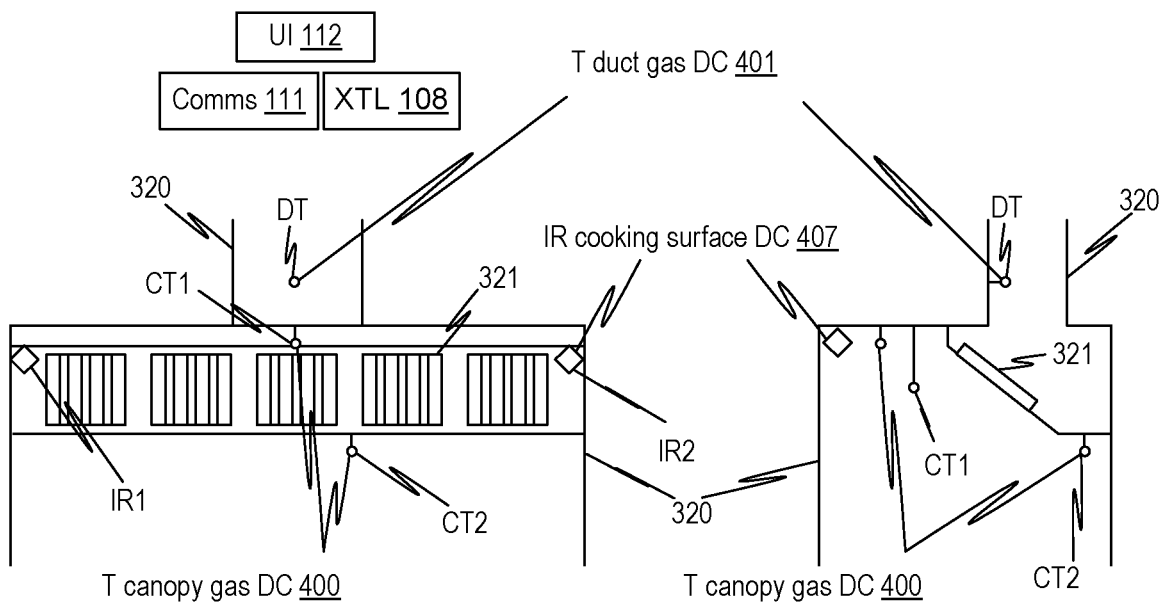
FIGS. 12A and 12B show front and side views of an exhaust hood with associated sensors, according to an embodiment of the disclosed subject matter.
Figure 12C:
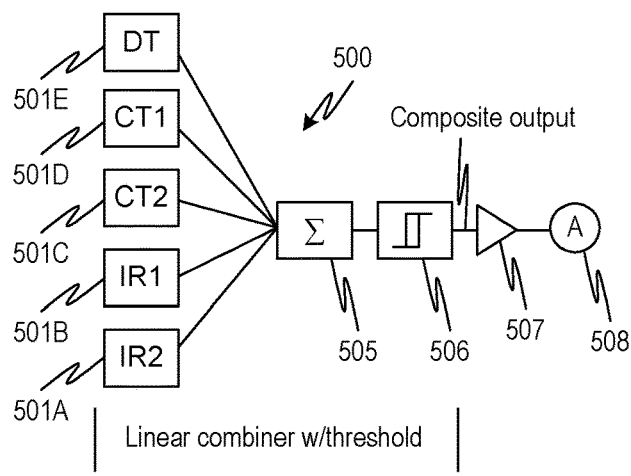
FIGS. 12C and 12D show symbolic processing diagrams of a fire detection system according to embodiments of the disclosed subject matter.

FIGS. 12A and 12B show simplified front and side views of a fume hood 320 with ancillary components described below. Referring now to FIGS. 12A and 12B, a system for exhaust flow control and fire detection has at least one (in the embodiment illustrated, two) canopy temperature sensors 400. Two canopy temperature sensors 400 CT1 and CT2 are shown but one or a larger number of canopy temperature sensors 400 may be provided. A duct gas temperature sensor 401 indicates the temperature of fumes drawn through an attached duct. The duct gas temperature sensor 401 may be mounted on a stalk to isolate it thermally from the wall of the duct 320. As are commonly used in commercial kitchen ventilation systems, grease filters 321 such as baffle-type filters may be positioned in an exhaust flow path. Fumes are drawn into and through the duct 320 by an exhaust fan. Infrared temperature sensors 407 may also be provided. In the disclosed embodiment, two infrared temperature sensors 407 identified as IR1 and IR2 are provided, but a smaller or greater number may be employed in other embodiments. The infrared temperature sensors 407 may be aimed at respective, conterminous, or overlapping regions of a cooking area of an appliance (such as a range, stove, or oven—not shown) under the fume hood 320. The fume hood 320 may be of a backshelf or canopy type configuration. The sensors generate output signals that are applied to a programmable controller 108 which may include communications 111 and user interface 112. The sensors may include signal filters. A/D converters may be included in the sensors or the controller 108. The temperature sensors may be resistance thermometers (RTDs), thermistors, thermocouples, quartz oscillators, or any other type of temperature sensor.

To minimize the exhaust flow rate required to achieve full capture and containment, it is known for a controller to detect a demand (fume load) and control the flow rate of the exhaust proportionately to the fume load. This is often called demand based control of exhaust flow. It can be achieved by modulating the position of a damper or by controlling a speed of an exhaust fan. The above-described infrared, duct temperature, and canopy temperature sensors, or a subset of them, may be used as inputs to regulate the flow of exhaust. For example, U.S. Pat. No. 9,494,324 to Livchak et al describes a control system that detects that appliance is off when infrared sensors and duct temperature sensors both indicate a level a threshold. The controller signals an idle condition of the appliance (e.g., a grill is heated up by burners but no food is cooking) when the infrared temperature sensors 407 indicate a threshold temperature and the controller 108 regulates the volume rate progressively over a range of flow rates in proportion to the temperature indicated by the duct case temperatures sensor 401. If the infrared temperature sensors 407 indicate a fluctuating temperature rise or fall that is beyond a threshold, i.e. the absolute vale of rate of change exceeds a predefined stored threshold, the controller 108 increases the flow rate to a design flow rate. They design flow rate is a designated maximum rate for the particular hood. This is an example of an exhaust flow control scheme employing infrared and duct gas temperature sensors. In this particular embodiment, the infrared 407 and duct gas 401 temperature sensors are combined with canopy temperature sensors 400 to provide additional functionality in fire detection.

Figure 12D:
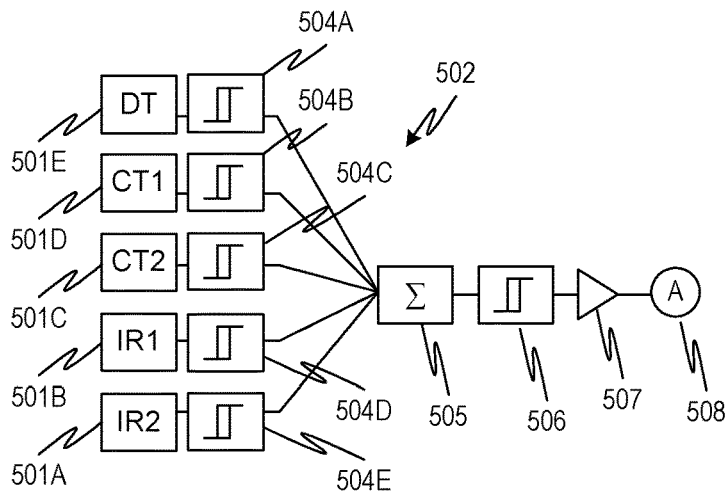
Figure 12E:
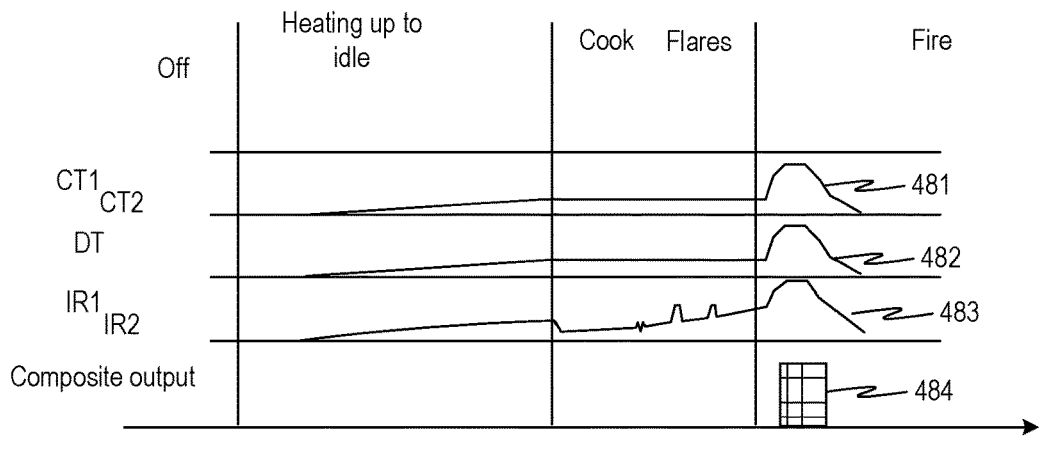
FIG. 12E shows, figuratively, sensor magnitudes of an embodiment of a fire detection system according to embodiments of the disclosed subject matter.
Figure 12F:
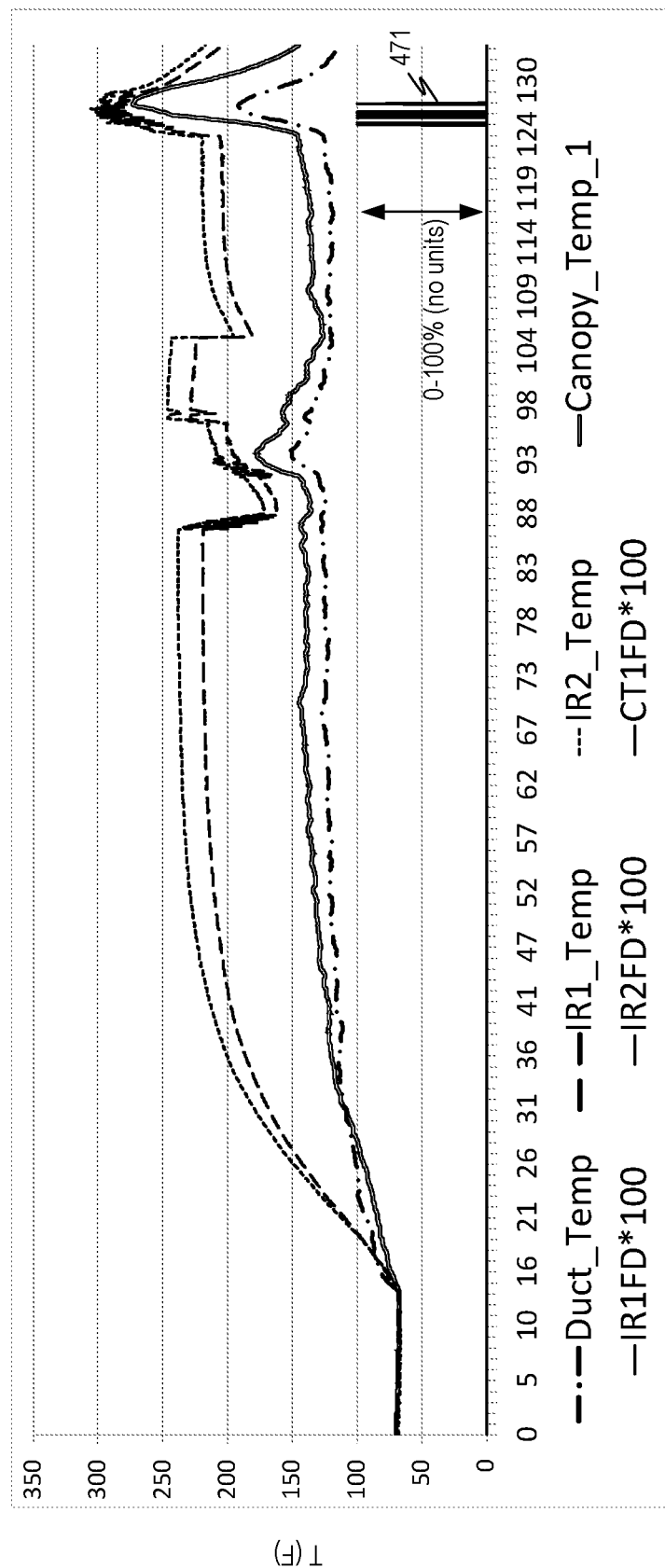
FIG. 12F shows measured sensor magnitudes of an embodiment of a fire detection system according to embodiments of the disclosed subject matter.

Referring now to FIGS. 12D and 12F, a linear combiner type fire detector is shown which combines signals from the canopy temperature sensors 400 (here identified as 501C and 501D), the exhaust duct temperature sensor 401 (here identified as 501E), and the infrared temperature sensors 407 (here identified as 501A and 501B) to generate a fire detection signal. The latter may trigger a response such as an alarm or a fire suppression response or any of the various responses identified in the foregoing. The output levels of the sensors 501A through 501E may be summed (after A/D conversion and normalization), numerically by the processor 108 to generate a composite output signal. The summing operation here is indicated at 505. The composite output signal compared by the controller 108 to an internally stored predefined threshold to generate a thresholded signal as indicated symbolically at 506. The thresholded output signal may be further applied to a driver 507 to generate an output signal or alarm 508. The thresholded signal may also be applied to other effecters such as a fire suppression system to cause suppressant to be applied to a region that is locally monitored by the sensors 501A through 501E. FIG. 12F shows a figurative graph of a typical signal. The canopy temperature remains flat and low through normal heating, cooking, and incidental flares attending cooking such as cooking burgers on a grill. This moderate behavior is a result of properly regulated exhaust flow. The curves shown exaggerate the smoothness and instantaneous measurements would evident random fluctuation and minor changes incident to flares and steam rising from cooking food. The sum signal of all of the sensors goes high when a fire occurs and once the sum signal reaches a threshold of thresholder 506, the output indicating a fire is generated. Note although the process for summing signals is linear, the use of a thresholder 506 is such that the final output nonlinear.

FIG. 12E shows a combiner in which each sensor 501A through 501E output is thresholded by thresholders 504A through 504E and the thresholded outputs summed by a summer 505 to generate an output that is thresholded 506. This is a kind of voting system where if a sufficient number of sensors (determined by the threshold of thresholder 506) vote that there is a fire, then the final output of the thresholder 506 indicates a fire.

An illustration of the effect of the compositing is shown in FIG. 12F. The present is an illustration of observations of various actual data from a test environment to summarize what happens during idle, cooking, non-fire cooking flare-ups, and fire outbreak a real commercial kitchen environment. At the start of a cooking operation, a gas grill is turned on. The grill heats up gradually and the exhaust flow control system regulates the flow rate to increase the flow rate as the fume load rises. At 464, the thresholding of the duct temperature signal outputs a thresholded duct temperature that is a short spike due to imperfect feedback control. This is not a harmful condition and the occasional appearance of a signal that exceeds a threshold does not generate composite output of the linear combiner of FIG. 12D. That is, the summed output does not exceed the threshold as it would when multiple sensors are generating an output signal combine.

Referring now to FIG. 12G, data from a further control scheme implemented by an embodiment of the controller 108 is shown. A fire detection signal is generated from signals from canopy temperature sensor 400 (Canopy_Temp_1), the exhaust duct temperature sensor 401 (Duct_Temp), and infrared temperature sensors 407 (IR1_Temp, IR2_Temp) to generate a fire detection signal. In this embodiment, an independent fire detect signal is generated by each sensor. The independent fire detect signal is indicated as 0 for false and 100 for true. A curve for each is indicate as IR1FD, IR2FD, CT1FD. The duct temperature is not used to generate a fire detect signal. The value of the respective infrared fire detect signals are 0 unless the DC signal from the respective infrared sensor indicates a radiant temperature of at least 250 F AND a rate of rise of the radiant temperature of at least 5.4 F/sec (degrees per second) where the output changes to 100% or True and the DC signal from the canopy temperature signal exceeds 150 F. In an additional embodiment, the absolute value of the rate of rise or fall of the radiant temperature is compared to this threshold and an output of True (100%) is generated. The fire detect signals are combined by the controller by generating a composite fire detect signal of True if all the individual fire detect signals are true at a given time. In a variant, the two infrared fire detect signals are OR-ed before being composited in this manner. Thus, composite fire detect signal is True if (IR1FD OR IR2FD) AND CT1FD is True. In addition, in embodiments, a delay operator may be applied to the instantaneous signals of each of the infrared fire detect signals. The magnitude of the delay, the threshold for the radiant temperature rate of change, the threshold radiant temperature and the canopy temperature may be provided as an adjustable value to an installer and accessed and changed through the user interface. The graphs of the fire detect signals indicating a fire (100%) appear as black curves exhibiting spikes as indicated at 471. The true false indications of the individual fire detect signals may have a time delay so that when they go true, they each stay true for a minimum time interval so that the chance of overlap of the individual fire detect signals is increased. The time delay may be an adjustable parameter through the user interface 112. The final fire detection output may have a lock such that once triggered, it remains triggered until rest by some event such as a user input or the completion of a predefined suppression regimen.

According to first embodiments, the disclosed subject matter includes a system for detecting a fire. A plurality of sensors is connected to a controller. The controller implements one or more signal filters to process signals from the plurality of sensors and apply a result to a classifier implemented on the controller. The classifier outputs a fire detection signal and a confidence level and applies the output to a response system.

Any of the first embodiments may be modified to form embodiments in which the response system includes a fire suppression system. Any of the first embodiments may be modified to form embodiments in which the response system includes a fire suppression that employs a chemical suppressant to extinguish a fire. Any of the first embodiments may be modified to form embodiments in which the response system includes a fire suppression that employs a gaseous suppressant to extinguish a fire. Any of the first embodiments may be modified to form embodiments in which the response system includes a fire suppression that employs a liquid suppressant to extinguish a fire.

Any of the first embodiments may be modified to form embodiments in which the classifier outputs data characterizing a fire. Any of the first embodiments may be modified to form embodiments in which the fire is characterized according to a type of fuel. Any of the first embodiments may be modified to form embodiments in which the fire is characterized according to a size of the fire. Any of the first embodiments may be modified to form embodiments in which the fire is characterized according to an amount of smoke. Any of the first embodiments may be modified to form embodiments in which the fire is characterized according to a temperature. Any of the first embodiments may be modified to form embodiments in which the response system receives the data characterizing a fire and selects one or at least two response modes responsively to the data characterizing a fire. Any of the first embodiments may be modified to form embodiments in which the response modes differ in terms of a type of suppressant.

Any of the first embodiments may be modified to form embodiments in which the response modes differ in terms of a quantity of suppressant. Any of the first embodiments may be modified to form embodiments in which the response modes differ in terms of a type of rate of delivery of a suppressant. Any of the first embodiments may be modified to form embodiments in which the response modes differ in terms of a type of a wait interval before a suppressant is delivered. Any of the first embodiments may be modified to form embodiments in which the response modes differ in terms of whether the response can be stopped by the activation of a personnel of an override control input. Any of the first embodiments may be modified to form embodiments in which the response modes differ according to data received from a user interface indicating a mode of a cooking operation. Any of the first embodiments may be modified to form embodiments in which the response modes differ according to data received from a user interface indicating a type of fuel used by a cooking operation. Any of the first embodiments may be modified to form embodiments in which the plurality of sensors includes a temperature sensor and a luminance sensor. Any of the first embodiments may be modified to form embodiments in which the plurality of sensors includes a gas temperature sensor and a radiant temperature sensor.

Any of the first embodiments may be modified to form embodiments in which the plurality of sensors includes an imaging device positioned in a duct, and the response system includes a water sprayer. Any of the first embodiments may be modified to form embodiments in which the imaging device applies an image to the one or more signal processors which are adapted to detect a gas-born ember. Any of the first embodiments may be modified to form embodiments in which the imaging device includes a visible light and/or infrared camera.

Any of the first embodiments may be modified to form embodiments in which the imaging device applies an image to the one or more signal processors which are adapted to detect a duct fire. Any of the first embodiments may be modified to form embodiments in which the sensors include a fouling detector configured to estimate a magnitude of fouling on a duct surface by measuring fouling on a surrogate (non-duct) surface. Any of the first embodiments may be modified to form embodiments in which the response system includes an illumination lamp. Any of the first embodiments may be modified to form embodiments in which the response system includes an illumination lamp.

Any of the first embodiments may be modified to form embodiments in which the illumination lamp is positioned to illuminate a cooking surface and is located within the recess of an exhaust hood. Any of the first embodiments may be modified to form embodiments in which the illumination lamp generates multiple colors in response to the fire detection signal. Any of the first embodiments may be modified to form embodiments in which the illumination lamp generates multiple colors in response to the fire detection signal and the confidence level.

According to second embodiments, the disclosed subject matter includes a system for detecting a fire. A plurality of sensors is connected to a controller. The controller implements one or more signal filters to process signals from the plurality of sensors and apply a result to a classifier implemented on the controller. The classifier outputs a fire detection signal and applies the output to a response system.

Any of the second embodiments may be modified to form embodiments in which the response system includes a fire suppression system. Any of the second embodiments may be modified to form embodiments in which the response system includes a fire suppression that employs a chemical suppressant to extinguish a fire. Any of the second embodiments may be modified to form embodiments in which the response system includes a fire suppression that employs a gaseous suppressant to extinguish a fire. Any of the second embodiments may be modified to form embodiments in which the response system includes a fire suppression that employs a liquid suppressant to extinguish a fire.

Any of the second embodiments may be modified to form embodiments in which the classifier outputs data characterizing a fire. Any of the second embodiments may be modified to form embodiments in which the fire is characterized according to a type of fuel. Any of the second embodiments may be modified to form embodiments in which the fire is characterized according to a size of the fire. Any of the second embodiments may be modified to form embodiments in which the fire is characterized according to an amount of smoke. Any of the second embodiments may be modified to form embodiments in which the fire is characterized according to a temperature. Any of the second embodiments may be modified to form embodiments in which the response system receives the data characterizing a fire and selects one or at least two response modes responsively to the data characterizing a fire. Any of the second embodiments may be modified to form embodiments in which the response modes differ in terms of a type of suppressant.

Any of the second embodiments may be modified to form embodiments in which the response modes differ in terms of a quantity of suppressant. Any of the second embodiments may be modified to form embodiments in which the response modes differ in terms of a type of rate of delivery of a suppressant. Any of the second embodiments may be modified to form embodiments in which the response modes differ in terms of a type of a wait interval before a suppressant is delivered. Any of the second embodiments may be modified to form embodiments in which the response modes differ in terms of whether the response can be stopped by the activation of a personnel of an override control input. Any of the second embodiments may be modified to form embodiments in which the response modes differ according to data received from a user interface indicating a mode of a cooking operation. Any of the second embodiments may be modified to form embodiments in which the response modes differ according to data received from a user interface indicating a type of fuel used by a cooking operation. Any of the second embodiments may be modified to form embodiments in which the plurality of sensors includes a temperature sensor and a luminance sensor. Any of the second embodiments may be modified to form embodiments in which the plurality of sensors includes a gas temperature sensor and a radiant temperature sensor.

Any of the second embodiments may be modified to form embodiments in which the plurality of sensors includes an imaging device positioned in a duct and the response system includes a water sprayer. Any of the second embodiments may be modified to form embodiments in which the imaging device applies an image to the one of more signal processors which are adapted to detect a gas-born ember. Any of the second embodiments may be modified to form embodiments in which the imaging device includes a visible light and/or infrared camera.

Any of the second embodiments may be modified to form embodiments in which the imaging device applies an image to the one of more signal processors which are adapted to detect a duct fire. Any of the second embodiments may be modified to form embodiments in which the sensors include a fouling detector configured to estimate a magnitude of fouling on a duct surface by measuring fouling on a surrogate (non-duct) surface. Any of the second embodiments may be modified to form embodiments in which the response system includes an illumination lamp.

Any of the second embodiments may be modified to form embodiments in which the illumination lamp is positioned to illuminate a cooking surface and is located within the recess of an exhaust hood. Any of the second embodiments may be modified to form embodiments in which the illumination lamp generates multiple colors in response to the fire detection signal. Any of the second embodiments may be modified to form embodiments in which the illumination lamp generates multiple colors in response to the fire detection signal and the confidence level.

According to third embodiments, the disclosed subject matter includes a duct protection system. At least one sensor is connected to a controller. The sensor is mounted in a duct. The sensor includes a radiant temperature-sensitive element responsive to burning material on a wall or material conveyed by gas flowing in the duct. A suppressant delivery pipe has a suppressant delivery valve and nozzle, the nozzle being positioned in the duct. The controller controls the suppressant delivery valve responsively to an output of the sensor.

Any of the third embodiments may be modified to form embodiments in which the duct is a modular duct section that can be retrofitted in a duct system.

Any of the third embodiments may be modified to form embodiments in which the delivery pipe is a water pipe.

Any of the third embodiments may be modified to form embodiments in which the sensor includes a thermal imaging device. Any of the third embodiments may be modified to form embodiments in which the thermal imaging device includes an infrared camera.

According to fourth embodiments, the disclosed subject matter includes a fire protection system for a commercial kitchen. A light blockage sensor includes (optionally) a retroreflector, and includes a light source and a photosensor. The retroreflector can return light from the light source which may be collocated with the photosensor or the photosensor can be opposite the light source. The light blockage sensor is positioned in a space adjacent a kitchen appliance where debris accumulates and outputting an indication of light blockage caused by accumulating debris.

Any of the fourth embodiments may be modified to form embodiments in which the light blockage sensor is positioned between a wall and a cooking appliance and responds to a light path between the photosensor and the retroreflector or light source. Any of the fourth embodiments may be modified to form embodiments in which the light path extends over a majority of a dimension of the appliance. Any of the fourth embodiments may be modified to form embodiments in which the appliance is a commercial fryer. Any of the fourth embodiments may be modified to form embodiments in which the debris includes grease and dust.

According to fifth embodiments, the disclosed subject matter includes a fire control system. A controller has at least one sensor connected to the controller. The controller has a display and input element that outputs an indication to select a type of kitchen appliance and receives a selection from a user indicating a selection indicating a type of appliance. The controller stores mode data responsive to the selection and controlling the display element to output an indication of a fire responsively to the mode data and data received from the at least one sensor.

Any of the fifth embodiments may be modified to form embodiments in which the at least one sensor includes a video camera. Any of the fifth embodiments may be modified to form embodiments in which the video camera output is applied to a video stream classifier implemented by the controller. Any of the fifth embodiments may be modified to form embodiments in which the classifier outputs attendance indication data of whether a person is present at a cooking appliance responsively to the model data and the attendance indication data. Any of the fifth embodiments may be modified to form embodiments in which the controller generates an alarm if a person is not present when a certain mode is indicated by the mode data. Any of the fifth embodiments may be modified to form embodiments in which the certain mode is associated with the burning of a predefined type of fuel required to be monitored continuously. Any of the fifth embodiments may be modified to form embodiments in which the predefined type of fuel is a solid fuel.

According to sixth embodiments, the disclosed subject matter includes a fire suppression system that outputs a staged response to a fire in response to a fire severity or type indication.

According to seventh embodiments, the disclosed subject matter includes a fire suppression system. A controller has a fire detection element that includes energy output and smoke sensors. The system has one or more controllers for separate exhaust hood dampers, each damper controlling flow through a respective hood connected to a common exhaust passage. The fire detection element is responsive to first and second types of fires, the first producing higher volume of smoke than the second, the second being associated with a greater tendency to spread quickly than the first. The controller operates the dampers responsively to a type of fire detected by the fire detection element.

Any of the seventh embodiments may be modified to form embodiments in which the first type of fire is indicated by high radiant energy output above a predefined magnitude. Any of the seventh embodiments may be modified to form embodiments in which the first type of fire is indicated by high radiant energy output above a predefined magnitude in combination with a level of smoke below a predefined magnitude. Any of the seventh embodiments may be modified to form embodiments in which the first type of fire is indicated by a ratio of radiant energy output to a level of smoke above a predefined magnitude. Any of the seventh embodiments may be modified to form embodiments in which the controller, in response to the first type of fire, opens all of the dampers simultaneously. Any of the seventh embodiments may be modified to form embodiments in which the controller, in response to the second type of fire, opens a subset of the dampers simultaneously and closes other of the dampers. Any of the seventh embodiments may be modified to form embodiments in which the controller, in response to either type of fire, maximizes an exhaust flow of the common exhaust passage.

According to eighth embodiments, the disclosed subject matter includes a fire suppression system with a narrow cone spray nozzle connected to a source of fire suppressant. A wide-angle imaging device is adapted to output a signal indicating a location of a fire and apply a signal indicating the same to a controller. The narrow cone spray nozzle having a direction actuator to permit the controller to aim the narrow cone spray nozzle at the location of the fire.

Any of the eighth embodiments may be modified to form embodiments in which the actuator is a pan tilt mechanism. Any of the eighth embodiments may be modified to form embodiments in which the fire suppressant is a foam suppressant. Any of the eighth embodiments may be modified to form embodiments in which the wide-angle imaging device is an infrared camera. Any of the eighth embodiments may be modified to form embodiments in which the wide-angle imaging device is a visible light camera.

According to ninth embodiments, the disclosed subject matter includes a method of suppressing a fire that includes applying a fire suppressant to a fire locally. detecting a response of the fire to the application of suppressant. The method includes releasing a building sprinkler system from a hold condition preventing the spray of water responsively to a result of the detecting.

Further variants of the method may include receiving a manual input through a user interface indicating an override signal. Still further variants may be such that the releasing is further responsive to the override signal. In still further variants, the fire suppressant is a chemical suppressant. In still further variants, the fire is in a kitchen.

In any embodiment, including the claims, an electronic nose may be provided in conjunction with a classifier to recognize fire risks and provide early warning of an incipient fire or fire hazard. In embodiments, such a system may permit the input of an override or other acknowledgment to cancel the warning signal. The warning signal may be output through the user interface, for example as a message or by means of a specific alarm sound or visible indicator for such purposes.

In all of the embodiments, a back up conventional fire detection and suppression system may be provided in conjunction with any of the other systems.

In any of the foregoing and claimed embodiments, the control system used for detecting fires may be used to detect the normal but varying status of a pollutant source such as a cooking appliance cooking surface and adjust the flow of exhaust to minimize the waste of conditioned air in the occupied space while ensuring capture and containment. It should be apparent that many of the sensors described herein, as well as the technology for classification of a state such as a fire can be used to determine a normal status of a cooking appliance, for example, to achieve exhaust control.

It will be appreciated that the modules, processes, systems, and sections described above can be implemented in hardware, hardware programmed by software, software instruction stored on a non-transitory computer readable medium or a combination of the above.

The devices and methods that receive sensor signals and output information that discriminate various possible conditions indicated by values of the sensor signals, such as fire conditions or fume load conditions, may be generally identified as classifiers or pattern recognition filters. In any of the embodiments, such mechanisms may employ sophisticated processor-based algorithms which produce estimates of the possible conditions and confidence estimates for each of them. In such methods a main process may be provided for classifying an input state vector, which vector is the set of multiple reduced inputs from multiple sensors. By reduced inputs it is meant that raw input data, such as the many pixels in a video image, are converted to quantitative and symbolic tokens to provide relevant information with less potential for overfitting. So, for example, a raw video image of 3 million pixels may be reduced by image processing and pattern recognition to a count of persons currently in an imaged scene. Further information may be provided such as the average speed of human motion or whether it fits a pattern of normal movement (e.g. by gait recognition the pattern recognizer may distinguish between running, which is abnormal, and walking). Another example may be where a camera's video stream is used derive peak brightness in a scene or contrast threshold of a region of the scene exceeding a brightness threshold, which may indicate the vigor of a fire. A similar issue arises with regard to audio data. Thus a front end pattern recognition process may include stages of processing rather than just a single process of classification, and the processing may include, aside form A/D conversion, filtering (e.g., image filtering and feature selection), orthogonal function decomposition, motion vector analysis, partitioning an N-dimensional state vector into zone, and other processes. In addition to input reduction, there is also an issue that certain states involve history and a current condition cannot simply be determined from a snapshot of the states of all the inputs. Rather, a history must be accrued. Motion vector extraction from video is an example. Gait recognition is another as is audio feature recognition. The effect of all this is that classification is a multi-stage process.

Thus, the sensor data that may applied to a machine learning based control system often has so many degrees of freedom as to make it difficult to train a robust pattern recognizer or classifier. And the problem of simplifying the feature space (input vector) used to train or otherwise build a classifier is a perennial one that creates unique challenges in each application. The unique opportunities and challenges include choosing which sensor types to use, where to locate them, what information content in each sensor type is more relevant for the recognition challenge and how to reduce the raw data to extract that information type through processing and, optionally, one or more intermediate stages of filtering and pattern/feature recognition, and a final classifier. Pattern recognition/classifier processes and devices may employ various algorithms and hardware element, which are known, are presently being developed, or will be developed in the future.

Recognizing objects, such as humans in images, using pattern recognition approaches is a known technology of computer vision and includes face recognition. Known technology may employ 3D scanners (infrared such as the Microsoft Kinect, autonomous vehicles, and product inspection systems). Examples are capable of face recognition and pedestrian detection. Many such approaches are known. Some employ machine learning to construct detectors or filters through supervised learning from training images. Simpler systems can apply thresholding to define simplified (chroma or luma partitioned) fields in a scene which are often called blobs in the field of video analysis. Such filters are scanned over an input image or video stream to identify best fit matching patterns. An algorithmic optimization of a fit (a type of regression, for example) can produce a pattern of best fit as well as an estimate of a goodness of fit (error) so that these pattern matching systems produce both a classification (best pattern fit) and a confidence estimate (a measure of the goodness of fit). The goodness of fit may derived from a value of an objective function after optimization, that is how good the fit is between the best fit pattern and the target. Fitting a pattern to features in a scene, which features move, provides additional information from a time sequence of images of a scene in allowing motion of recognized objects to be estimated. Thus a number statistics indicating the speed and direction of movement can be obtained from a video stream. Even very simplified recognition algorithms can be used, for example, if simply discrete blobs and their speed and directions of motion are derived, this can be a reasonable indicator of the level of activity of personnel in a scene. This may, for example, be used to discriminate between normal patterns of motion associated with working personnel and a panic situation caused by a fire emergency.

Figure 14:
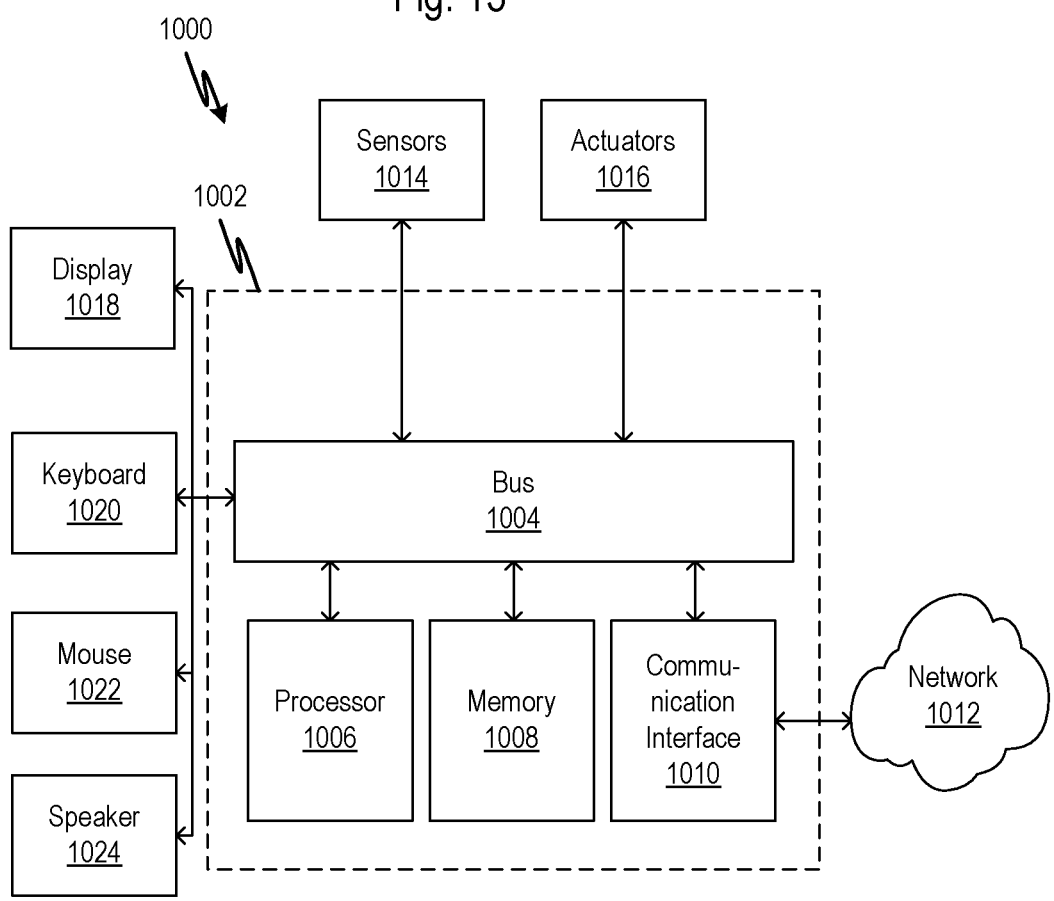
FIG. 14 shows a block diagram of an example computer system that can be used as a basis for each or all of the modular computational elements discussed with regard to each embodiment of the disclosed subject matter.

FIG. 14 shows a block diagram of an example computer system according to embodiments of the disclosed subject matter. In various embodiments, all or parts of system 1000 may be included in a medical treatment device/system such as a renal replacement therapy system. In these embodiments, all or parts of system 1000 may provide the functionality of a controller of the medical treatment device/systems. In some embodiments, all or parts of system 1000 may be implemented as a distributed system, for example, as a cloud-based system.

System 1000 includes a computer 1002 such as a personal computer or workstation or other such computing system that includes a processor 1006. However, alternative embodiments may implement more than one processor and/or one or more microprocessors, microcontroller devices, or control logic including integrated circuits such as ASIC.

Computer 1002 further includes a bus 1004 that provides communication functionality among various modules of computer 1002. For example, bus 1004 may allow for communicating information/data between processor 1006 and a memory 1008 of computer 1002 so that processor 1006 may retrieve stored data from memory 1008 and/or execute instructions stored on memory 1008. In one embodiment, such instructions may be compiled from source code/objects provided in accordance with a programming language such as Java, C++, C#, .net, Visual Basic™ language, LabVIEW, or another structured or object-oriented programming language. In one embodiment, the instructions include software modules that, when executed by processor 1006, provide renal replacement therapy functionality according to any of the embodiments disclosed herein.

Memory 1008 may include any volatile or non-volatile computer-readable memory that can be read by computer 1002. For example, memory 1008 may include a non-transitory computer-readable medium such as ROM, PROM, EEPROM, RAM, flash memory, disk drive, etc. Memory 1008 may be a removable or non-removable medium.

Bus 1004 may further allow for communication between computer 1002 and a display 1018, a keyboard 1020, a mouse 1022, and a speaker 1024, each providing respective functionality in accordance with various embodiments disclosed herein, for example, for configuring a treatment for a patient and monitoring a patient during a treatment.

Computer 1002 may also implement a communication interface 1010 to communicate with a network 1012 to provide any functionality disclosed herein, for example, for alerting a healthcare professional and/or receiving instructions from a healthcare professional, reporting patient/device conditions in a distributed system for training a machine learning algorithm, logging data to a remote repository, etc. Communication interface 1010 may be any such interface known in the art to provide wireless and/or wired communication, such as a network card or a modem.

Bus 1004 may further allow for communication with a sensor 1014 and/or an actuator 1016, each providing respective functionality in accordance with various embodiments disclosed herein, for example, for measuring signals indicative of a patient/device condition and for controlling the operation of the device accordingly. For example, sensor 1014 may provide a signal indicative of a viscosity of a fluid in a fluid circuit in a renal replacement therapy device, and actuator 1016 may operate a pump that controls the flow of the fluid responsively to the signals of sensor 1014.

A method for fire detection and/or suppression can be implemented, for example, using a processor, or system as described with reference to FIG. 14, configured to execute a sequence of programmed instructions stored on a non-transitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, LabVIEW, or another structured or object-oriented programming language. The sequence of programmed instructions and data associated therewith can be stored in a non-transitory computer-readable medium such as a computer memory or storage device which may be any suitable memory apparatus, such as, but not limited to read-only memory (ROM), programmable read-only memory (PROM), electrically erasable programmable read-only memory (EEPROM), random-access memory (RAM), flash memory, disk drive and the like.

Furthermore, the modules, processes, systems, and sections can be implemented as a single processor or as a distributed processor. Further, it should be appreciated that the steps mentioned above may be performed on a single or distributed processor (single and/or multi-core). Also, the processes, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a programmable logic device (PLD), programmable logic array (PLA), field-programmable gate array (FPGA), programmable array logic (PAL) device, or the like. In general, any process capable of implementing the functions or steps described herein can be used to implement embodiments of the method, system, or a computer program product (software program stored on a non-transitory computer readable medium).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a very-large-scale integration (VLSI) design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of control systems, signal processing, machine intelligence and/or computer programming arts.

Moreover, embodiments of the disclosed method, system, and computer program product can be implemented in software executed on a programmed general purpose computer, a special purpose computer, a microprocessor, or the like.

It is, thus, apparent that there is provided, in accordance with the present disclosure, fire detection and suppression systems methods and devices. Many alternatives, modifications, and variations are enabled by the present disclosure. Features of the disclosed embodiments can be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present invention.

What is claimed is:

1. A system for detecting a fire, comprising:
   a plurality of sensors;
   a response system; and
   a controller connected to the plurality of sensors, the controller implementing one or more signal filters to process signals from the plurality of sensors and apply a result to a classifier implemented on the controller, the classifier outputting a fire detection signal and a confidence level and applying the output to the response system,
   wherein the plurality of sensors includes an imaging device positioned in a duct configured to draw fumes from an exhaust hood and the response system includes a water sprayer,
   the imaging device applies captured real-time images to said one or more signal filters which are adapted to detect a gas-born ember, and
   by applying the captured real-time images to said one or more signal filters, the imaging device is configured to detect a gas-born ember located within the duct.

2. The system of claim 1, wherein the response system includes a fire suppression system.

3. The system of claim 1, wherein the response system includes a fire suppression that employs a suppressant to extinguish a fire, wherein the suppressant includes at least one of a chemical suppressant, a gaseous suppressant, or a liquid suppressant.

4. The system of claim 3, wherein the classifier outputs data characterizing a fire.

5. The system of claim 4, wherein the fire is characterized according to at least one of a type of fuel, a size of the fire, an amount of smoke, or a temperature.

6. The system of claim 5, wherein the response system receives said data characterizing the fire and selects one or at least two response modes responsively to said data characterizing the fire.

7. The system of claim 6, wherein the response modes differ in terms of at least one of a type of the suppressant, a quantity of the suppressant, a type of rate of delivery of the suppressant, a type of a wait interval before the suppressant is delivered, or whether the response can be stopped by the activation of personnel of an override control input.

8. The system of claim 6, wherein the response modes differ according to data received from a user interface indicating at least one of a mode of a cooking operation or a type of fuel used by the cooking operation.

9. The system of claim 1, wherein the plurality of sensors includes a temperature sensor and a luminance sensor.

10. The system of claim 1, wherein the plurality of sensors includes a gas temperature sensor and a radiant temperature sensor or an electronic nose.

11. The system of claim 1, wherein the imaging device includes a visible light and/or infrared camera.

12. The system of claim 1, wherein the response system includes an illumination lamp.

13. The system of claim 12, wherein the illumination lamp is positioned to illuminate a cooking surface and is located within a recess of an exhaust hood.

14. The system of claim 13, wherein the illumination lamp generates multiple colors in response to said fire detection signal.

15. The system of claim 14, wherein the illumination lamp generates multiple colors in response to said fire detection signal and said confidence level.

16. The system of claim 1, wherein at least one of the implemented signal filters that processes signals from the plurality of sensors and applies the result to the classifier comprises a threshold filter with an adjustable threshold.

17. The system of claim 1, wherein the gas-born ember located within the duct comprises a gas-born burning material.

18. The system of claim 1, wherein the imaging device positioned in the duct comprises a thermal imaging device and the real-time images captured and applied to the one or more signal filters adapted to detect a gas-born ember comprise real-time thermal images.

19. The system of claim 1, wherein the one or more signal filters which are adapted to detect a gas-born ember are different from signal filters which are adapted to detect a fire condition.

20. The system of claim 1, wherein the imaging device positioned in the duct comprises a wide angle imaging device.

* * * * *